(12) United States Patent
Kondekar

(10) Patent No.: US 8,498,788 B2
(45) Date of Patent: Jul. 30, 2013

(54) METHOD AND SYSTEM FOR DETERMINING A PLANNED PATH OF A VEHICLE

(75) Inventor: Ritesh Kondekar, Navi Mumbai (IN)

(73) Assignee: Deere & Company, Moline, IL (US)

( * ) Notice: Subject to any disclaimer, the term of this patent is extended or adjusted under 35 U.S.C. 154(b) by 189 days.

(21) Appl. No.: 13/187,576

(22) Filed: Jul. 21, 2011

(65) Prior Publication Data

US 2012/0101725 A1 Apr. 26, 2012

Related U.S. Application Data

(60) Provisional application No. 61/406,704, filed on Oct. 26, 2010.

(51) Int. Cl.
*G06F 7/70* (2006.01)
(52) U.S. Cl.
USPC .............................. 701/50; 701/445; 701/468
(58) Field of Classification Search
USPC .............................. 701/23, 50, 425, 445, 468
See application file for complete search history.

(56) References Cited

U.S. PATENT DOCUMENTS

| | | | |
|---|---|---|---|
| 5,187,663 A | 2/1993 | Kamimura et al. | |
| 5,995,902 A | 11/1999 | Monson | |
| 6,907,336 B2 | 6/2005 | Gray et al. | |
| 6,934,615 B2 | 8/2005 | Flann et al. | |
| 7,010,425 B2 | 3/2006 | Gray et al. | |
| 7,079,943 B2 | 7/2006 | Flann et al. | |
| 7,110,881 B2 | 9/2006 | Gray et al. | |
| 7,216,033 B2 | 5/2007 | Flann et al. | |
| 7,228,214 B2 | 6/2007 | Flann et al. | |
| 7,349,763 B2 | 3/2008 | Ivans | |
| 7,451,030 B2 | 11/2008 | Eglington et al. | |
| 7,689,356 B2 | 3/2010 | Dix et al. | |
| 8,204,654 B2 * | 6/2012 | Sachs et al. | 701/50 |
| 2004/0193349 A1 * | 9/2004 | Flann et al. | 701/50 |
| 2007/0192024 A1 * | 8/2007 | Flann et al. | 701/207 |
| 2011/0112730 A1 * | 5/2011 | Rekow | 701/50 |
| 2011/0178669 A1 * | 7/2011 | Tanaka et al. | 701/25 |
| 2012/0136508 A1 * | 5/2012 | Taylor et al. | 701/2 |

FOREIGN PATENT DOCUMENTS

| | | | |
|---|---|---|---|
| EP | 2236020 A1 | 10/2010 | |
| WO | 2010/018400 | 2/2010 | |

OTHER PUBLICATIONS

EP Search Report dated Feb. 15, 2012, 5 pages.

* cited by examiner

*Primary Examiner* — Helal A Algahaim

(57) ABSTRACT

A boundary definer defines an outer boundary of a region as a series of interconnected generally linear segments joined at one or more nodes. A concave surface identifier or data processor identifies each concave surface associated with a corresponding concave node. At least one subdivision line is established to divide the region into subdivided areas, where the subdivision line interconnects at or near two nonadjacent ones of the concave nodes. The data processor or row orientation module determines a direction of orientation of rows for a planned path of the vehicle within each subdivided area. A path planning module or data processor interconnects the planned paths within or between subdivided areas to each other by planned interconnection paths between termination points of the rows or at the nodes.

22 Claims, 22 Drawing Sheets

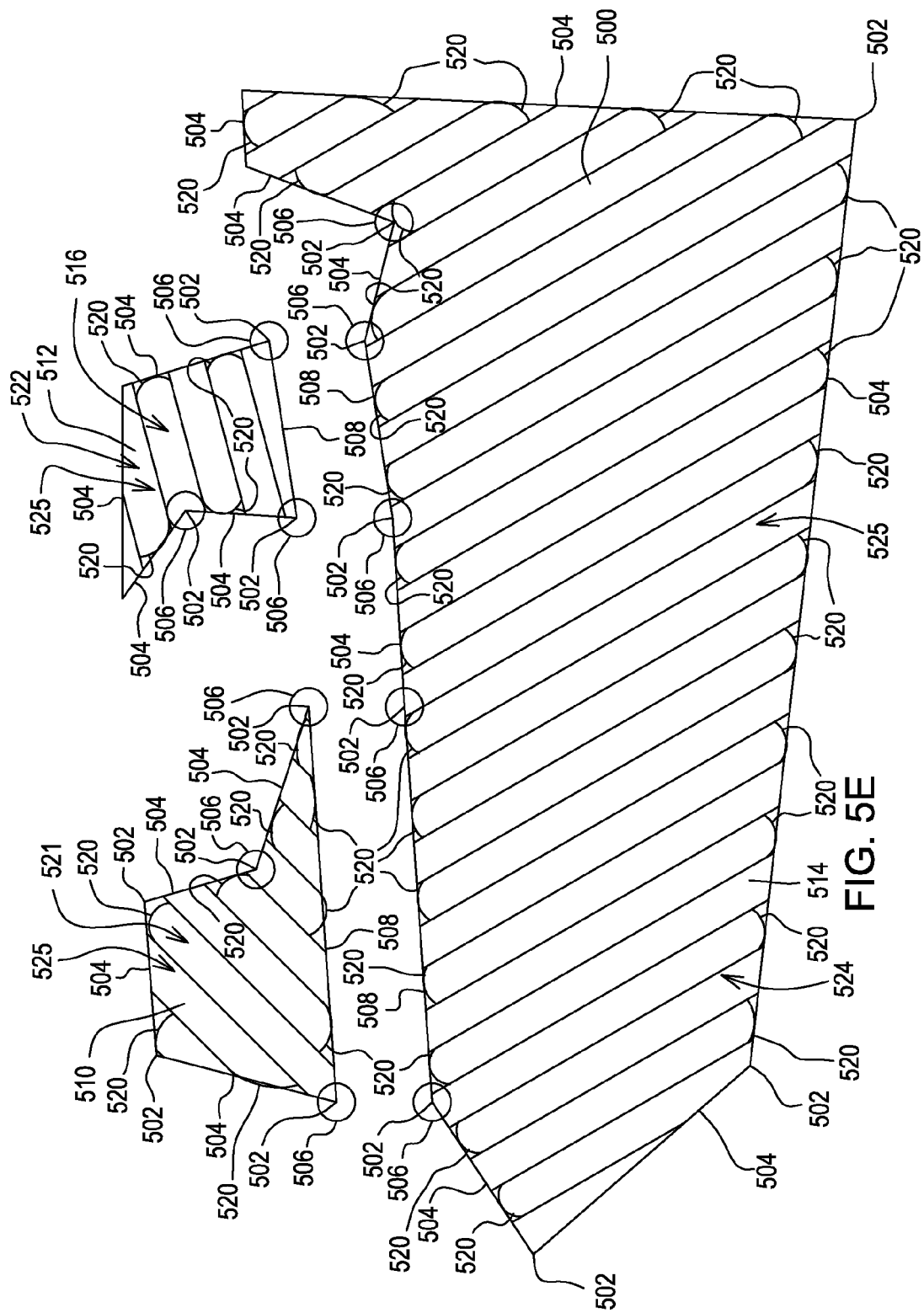

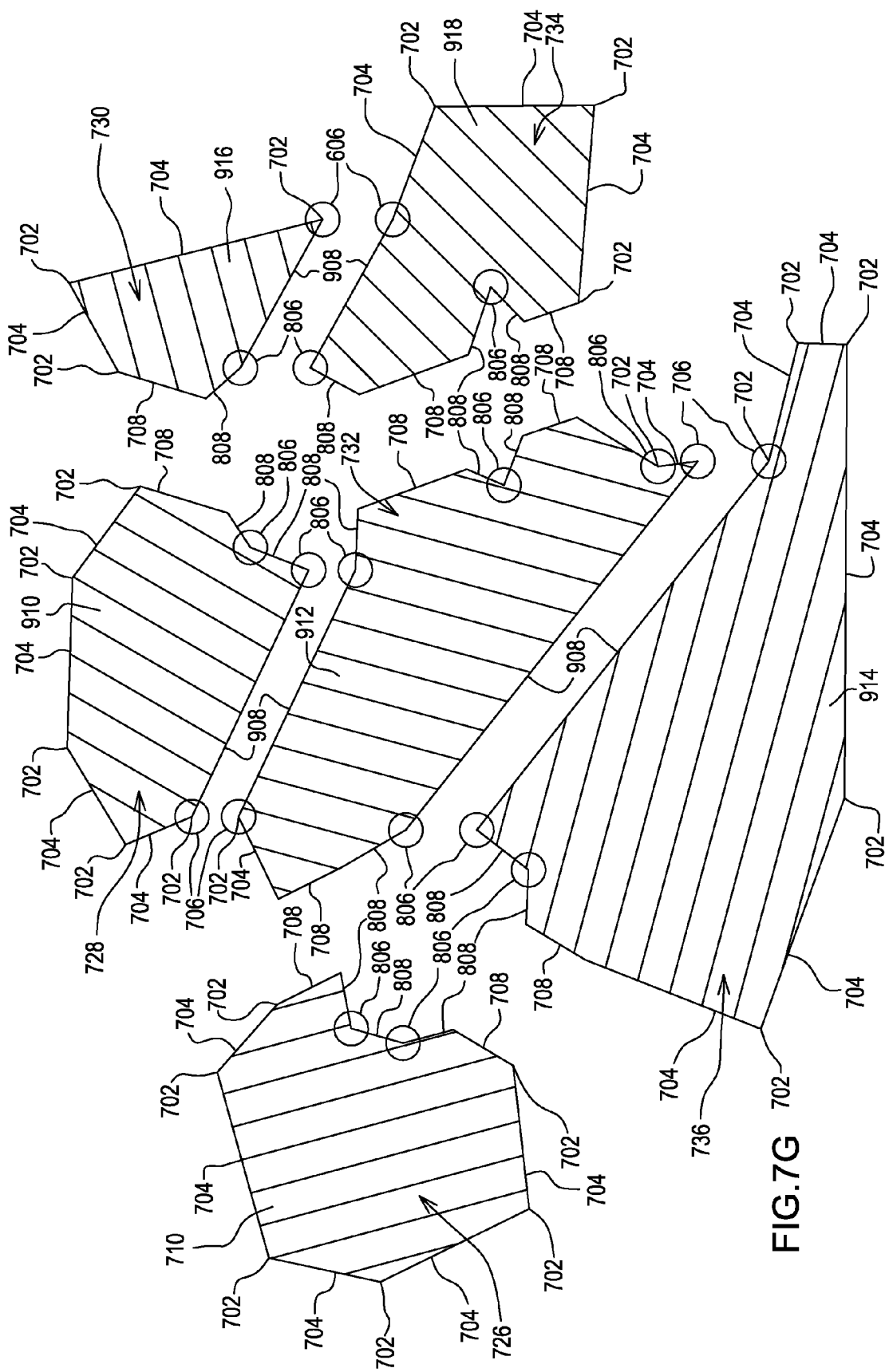

METHOD AND SYSTEM FOR DETERMINING A PLANNED PATH OF A VEHICLE

This document claims priority based on U.S. provisional application Ser. No. 61/406,704, filed on 26 Oct. 2010 and entitled METHOD AND SYSTEM FOR DETERMINING A PLANNED PATH OF A VEHICLE, under 35 U.S.C. 119(e).

FIELD OF THE INVENTION

This invention relates to a method and system for determining a planned path of a vehicle.

BACKGROUND OF THE INVENTION

Vehicles may be used in agricultural, forestry, construction, mining, or for other applications. Some applications may require an off-road vehicle to traverse or cover an entire area with one or more paths of the vehicle. For example, a vehicle may be required to plant crops, to harvest crops, or to distribute crop inputs, such as fertilizer or chemicals, over a field or plants within an entire area of a field. If the field has an ordinary rectangular shape, the vehicle operator may cover the entire area of the field by manually or automatically controlling the vehicle to follow an array of parallel sub-paths through the field that are parallel to a linear edge of the field, where a location-determining receiver (e.g., Global Positioning System) receiver may provide location data to assist the operator in following the parallel sub-paths. However, if the field has a complex, irregular polygonal shape, there is a need for automated planning of the path to achieve an efficient solution that minimizes at least one of fuel costs, vehicle operating time, or other operational costs of the vehicle.

SUMMARY OF THE INVENTION

In accordance with one embodiment, a method and system for determining a planned path for a vehicle comprises a boundary definer for defining an outer boundary of a region as a series of interconnected generally linear segments that are joined at one or more nodes. A concave surface identifier or data processor identifies each concave surface associated with a corresponding concave node, among the nodes, by determining if an interior angle formed by the interconnected linear segments (e.g., of the outer boundary) is greater than a threshold angle (e.g., approximately one-hundred and eighty degrees). At least one subdivision line is established to divide the region into subdivided areas, where the subdivision line interconnects at or near two nonadjacent ones of the concave nodes. The data processor or row orientation module determines a direction of orientation of rows (e.g., generally parallel array of rows) for a planned path of the vehicle within each subdivided area. For example, the data processor or the row orientation module determines a direction of orientation of a generally parallel array of rows in a predefined relationship (e.g., fractional multiple) of an interior angle associated with one or more concave nodes that are not interconnected by the subdivision line. A path planning module or data processor interconnects the planned paths within or between subdivided areas to each other by planned interconnection paths between termination points of the rows or at the nodes.

BRIEF DESCRIPTION OF THE DRAWINGS

FIG. 5E is a plan view of an illustrative example of interconnecting the planned paths associated with different subdivided areas in the first illustrative region.

FIG. 7G is a plan view of an illustrative example of determining the direction or orientation of rows for a planned path of the vehicle in the third illustrative region.

DESCRIPTION OF THE PREFERRED EMBODIMENT

Figure 1:
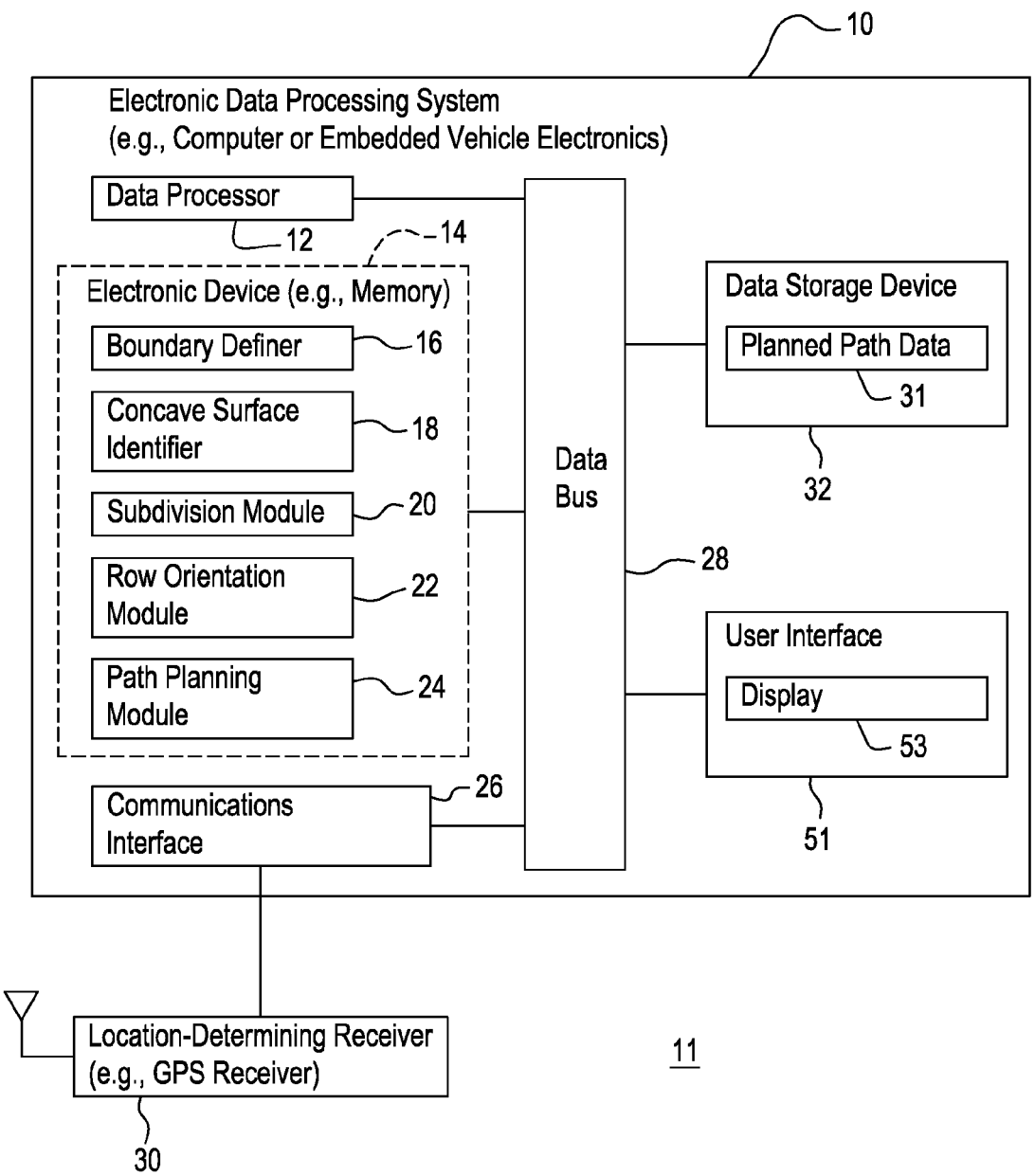
FIG. 1 is block diagram of one embodiment of a system for determining a planned path of a vehicle.

In accordance with one embodiment, illustrated in FIG. 1, the system 11 of comprises the electronic data processing system 10 coupled to a location determining receiver 30. The electronic data processing system 10 is well-suited for determining a planned path of a vehicle that covers an irregular, polygonal-shaped region, by subdividing the region into multiple areas or subdivisions. The electronic data processing system 10 may comprise a general purpose computer that is programmed with various programming instructions or modules that are stored in an electronic device 14 (e.g., electronic memory), or elsewhere.

The electronic data processing system 10 comprises a data processor 12, an electronic device 14, a data storage device 32, a communications interface 26, and a user interface 51 that are coupled to a data bus 28. The electronic data processing system 10 may comprise a general purpose computer that is programmed with software instructions or modules that are stored in the data storage device 32 or the electronic device 14, for example. The data processor 12 may communicate with one or more of the following via the data bus 28: the electronic device 14, the data storage device 32, the communications interface 26, the user interface 51, and the location-determining receiver 30.

The data processor 12 comprises a microprocessor, a microcontroller, a programmable logic array, an application-specific integrated circuit, a logic device or another electronic device 14 for processing, inputting, outputting, manipulating, storing or retrieving data. For example, the data processor 12 is capable of applying a mathematical operations or Boolean logic operations to inputted data to yield output data.

The electronic device 14 comprises electronic memory, nonvolatile random access memory, flip-flops, a computer-writable or computer-readable storage medium, or another electronic device for storing, retrieving, reading or writing data.

The data storage device 32 may comprise any of the following: electronic memory, an optical data storage device, a magnetic storage device, an optical disc drive, a magnetic disc drive, a hard disk drive, or the like. As illustrated in FIG. 1, that data storage device 32 stores planned path data 31, for example. The planned path data may comprise a series or sequence of geographic coordinates or way points that a vehicle follows to reach one or more destination points from a starting point or position of the vehicle.

The user interface 51 may comprise a display 53, a keyboard, a keypad, a switch, a pointing device (e.g., electronic or optical mouse), or another device for inputting, entering or outputting data associated with the data processing system 10 or any of the methods, procedures or techniques disclosed in this document. For example, the display 53 may display any path plan or resulting aggregate path plan for the vehicle to cover the region or work area.

The communications interface 26 may comprise a transceiver or a data port (e.g., input/output data port), parallel data port, serial data port, or another communications interface that facilitates communications between the electronic data processing system 10 and a location-determining receiver 30.

The location-determining receiver 30 may comprise a receiver that uses satellite signals, terrestrial signals, or both to determine the location or position of an object or the vehicle. In one embodiment, the location-determining receiver 30 comprises a Global Positioning System (GPS) receiver with a differential correction receiver for providing precise measurements of the geographic coordinates or position of the vehicle. The differential correction receiver may receive satellite or terrestrial signal transmissions of correction information from one or more reference stations with generally known geographic coordinates to facilitate improved accuracy in the determination of a location for the GPS receiver, for example.

As shown in FIG. 1, the electronic device 14 stores one or more of the following software program modules or software instructions: a boundary definer 16, a concave surface identifier 18, a subdivision module 20, a row orientation module 22, and a path planning module 24. The boundary definer 16 comprises a program module or software instructions that allow an operator of a vehicle to establish, input, enter, record, store and retrieve a model of a boundary of a work area or region, or geographic coordinates of reference points (e.g., or generally linear segments) lying on a boundary of a work area or region of the vehicle. For example, the user interface 51 allows the operator to trigger the recording of reference points on the boundary via the location-determining receiver 30 and the associated boundary definer 16.

The concave surface identifier 18 comprises a program module or software instructions that analyzes a boundary of a work area or region (e.g., generally polygonal work are or region) to identify or detect concave surface portions associated with the boundary in accordance with a mathematical criteria, a geometric criteria, predefined rules, or an algorithm. For instance, the rules may be expressed as if-then statements or instructions.

The subdivision module 20 comprises a program module or software instructions for subdividing the region into multiple subdivided areas by reference to one or more nodes associated with the detected concave surface portions in accordance with a set of predefined rules, an algorithm, or otherwise. For example, the rules can be expressed as if-then statements or instructions. In one embodiment, the subdivision module 20 is capable of subdividing subdivided areas into lesser subdivided areas.

The row orientation module 22 comprises a program module or software instructions that facilitates orientation of adjacent rows within each subdivided area. For example, the rows may be oriented with reference to a fractional multiple (or alternately, a nonzero integer multiple) of an interior angle at a selected node formed by the intersection of generally linear segments of the subdivided area. In one embodiment, the selected node may comprise a corner node or convex node of the region that protrudes outward from the boundary of the region.

The path planning module 24 comprises a program module or software instructions that select path plans to interconnect paths, swaths, routes or passes of the vehicle: (a) within each subdivided area, (b) between different subdivided areas, (c) within lesser subdivided areas, and/or (d) between lesser subdivided areas. For example, the path planning module 24 provides software instructions to facilitate connecting one or more of the following: adjacent ends of rows in a subdivided area into a continuous path plan segment or the terminations (e.g., end points or starting points) of rows or nodes into continuous aggregate planned paths for the vehicle to interconnect subdivided areas or lesser subdivided areas in an efficient manner. The path planning module 24 program instructions may comprise a search algorithm for a quickest executable (e.g., shortest time of estimated completion) overall path plan to cover the region, the shortest overall path plan to cover the region, the shortest path plan to cover one or more subdivided areas, or the quickest executable path plan to cover one or more subdivided areas.

Figure 2:
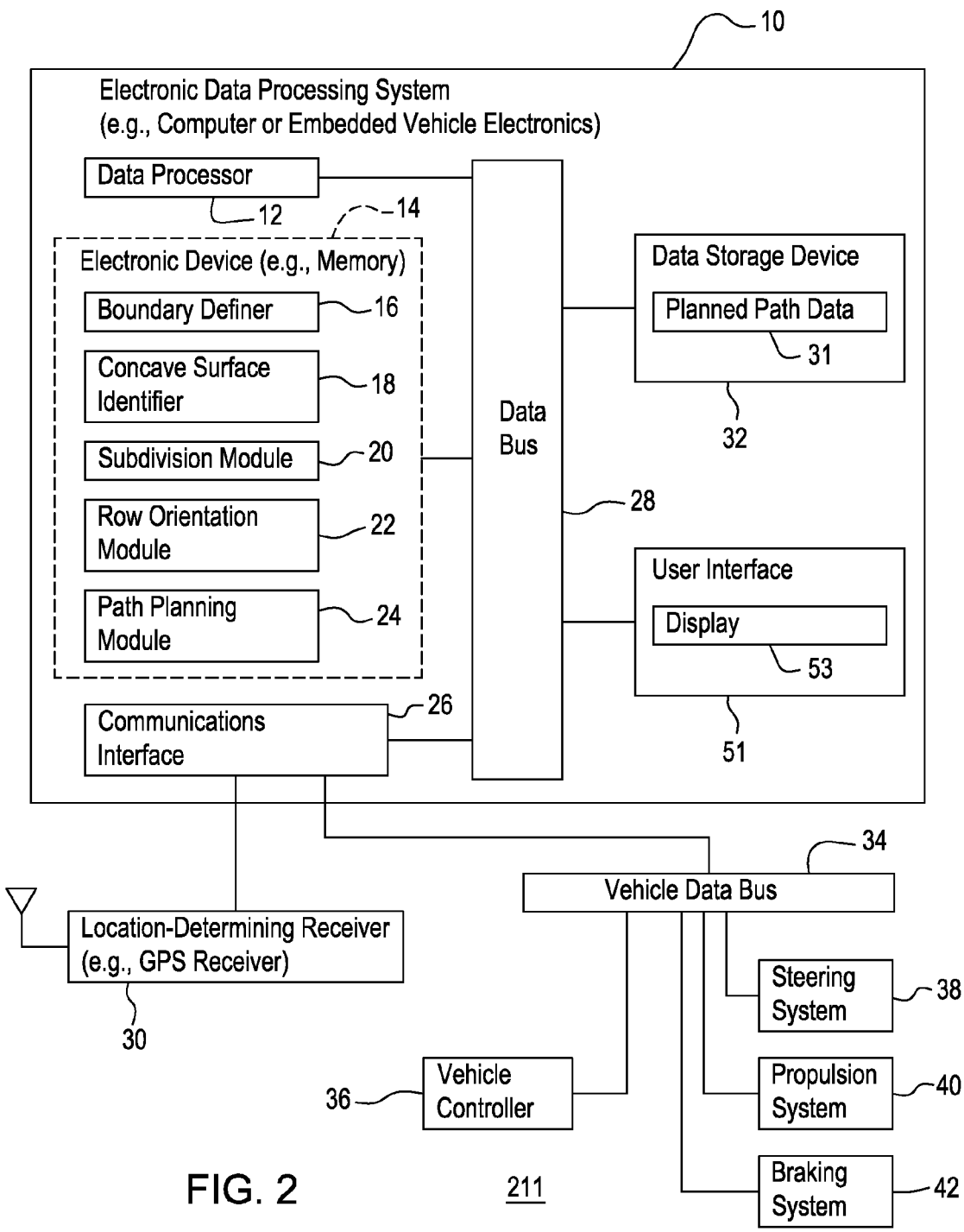
FIG. 2 is block diagram of another embodiment of a system for determining a planned path of a vehicle.

The system 211 of FIG. 2 is similar to the system 11 of FIG. 1, except the system 211 of FIG. 2 further comprises a vehicle data bus 28, a vehicle controller 36, a steering system 38, a propulsion system 40 and a braking system 42.

In FIG. 2, the vehicle data bus 28 is coupled to the communication interface. The vehicle data bus 34 supports communications between one or more of the following components: the vehicle controller 36, the steering system 38, the propulsion system 40, the braking system 42, the data processor 12, and the communications interface 26.

A vehicle controller 36 comprises a device for steering or navigating a vehicle consistent with a planned path (e.g., planned path data 31) or other instructions provided by an operator. The steering system 38 comprises a rack-and-pinion steering system, a mechanical linkage, a hydraulic steering system, an electro-hydraulic steering system, an electronic drive-by-wire system, an electrically assisted mechanical steering linkage, or another mechanism for steering or turning one or more wheels of the vehicle. The steering system 38 has an electronic or electrical interface for communicating data messages via the vehicle data bus 34, for monitoring the steering of the vehicle, and for controlling the steering of the vehicle. The steering system 38 is capable of communicating the data messages (e.g., control and status messages) to the vehicle controller 36 or the data processor 12, for example.

In an alternative embodiment, the steering system 38 comprises a system for differential rotation of one or more drive wheels of the vehicle to torque steer the vehicle.

A propulsion system 40 comprises an internal combustion engine, an electric motor, a hybrid propulsion configuration that comprises a combination of an internal combustion engine and one or more electric motors, or the like. The propulsion system 40 has an electronic or electrical interface (e.g., engine controller, transmission controller or a combination engine and transmission controller) for communicating data messages via the vehicle data bus 34, for monitoring the propulsion of the vehicle, and for controlling the propulsion of the vehicle. The propulsion system 40 is capable of communicating the data messages (e.g., control and status messages) to the vehicle controller 36 or the data processor 12, for example.

A braking system 42 comprises a mechanical braking system, a cable braking system, a hydraulic braking system, an electromechanical braking system, a pneumatic braking system, an air-braking system, a brake-by-wire braking system, or the like. The braking system 42 has an electronic or electrical interface (e.g., braking controller) for communicating data messages via the vehicle data bus 34, for monitoring the braking of the vehicle, and for controlling the braking, deceleration, slowing or stopping of the vehicle. The braking system 42 is capable of communicating the data messages (e.g., control and status messages) to the vehicle controller 36 or the data processor 12, for example.

Figure 3:
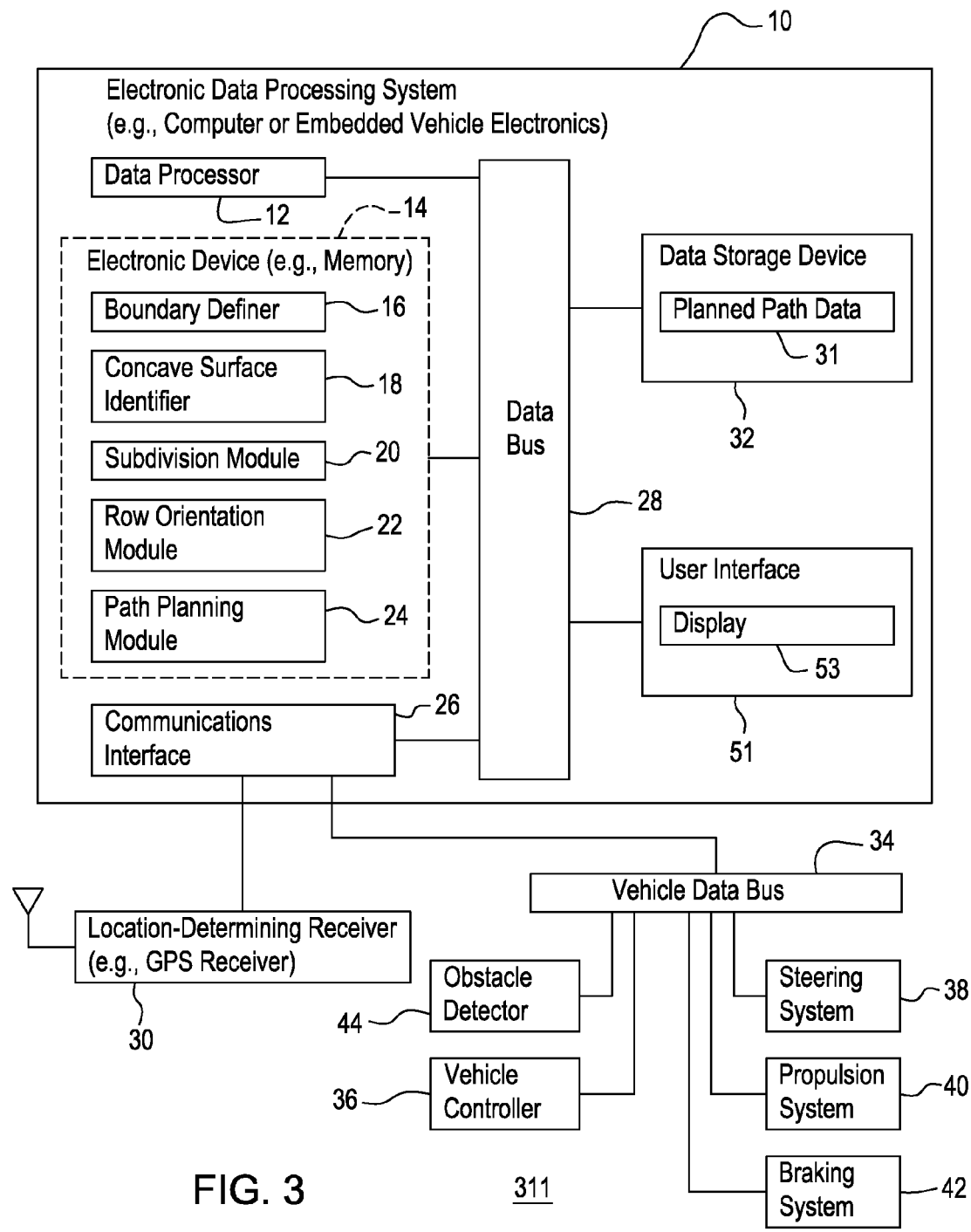
FIG. 3 is block diagram of yet another embodiment of a system for determining a planned path of a vehicle.

The system 311 of FIG. 3 is similar to the system 211 of FIG. 2, except the system 311 of FIG. 3 further comprises an obstacle detector 44. The obstacle detector 44 is coupled to the vehicle data bus 34. The obstacle detector 44 may communicate with one or more of the following components via the vehicle data bus 34: data processor 12, vehicle controller 36, steering system 38, propulsion system 40, and braking system 42. The obstacle detector 44 may comprise a range finder, a laser range finder, a stereo vision system, an ultrasonic sensor, a radar system, or another device for detecting the presence or location of obstacles in the region, or work area around the vehicle. The obstacle detector 44 further comprises software for distinguishing obstacles from the background or other objects in the field of view, or detection, for example.

In one embodiment, the obstacle detector 44 is adapted to detect an obstacle in a subdivision line for dividing the region into subdivided areas between nodes associated with identified concave areas. Further, the obstacle detector 44 is capable of communication with the data processing system 10 via a vehicle data bus 34 and the communications interface 26, wherein the path planning module 24 is arranged or instructed to search for the shortest distance of multiple linear segments between the detected obstacle and the nonadjacent ones of nodes. The path planning module 24 is capable of replacing or interconnecting at least a segment of the subdivision line with one or more linear segments (e.g., vehicle path traversable segments) associated with an inner boundary of the obstacle (e.g., to extend between the nonadjacent ones of the nodes).

Figure 4:
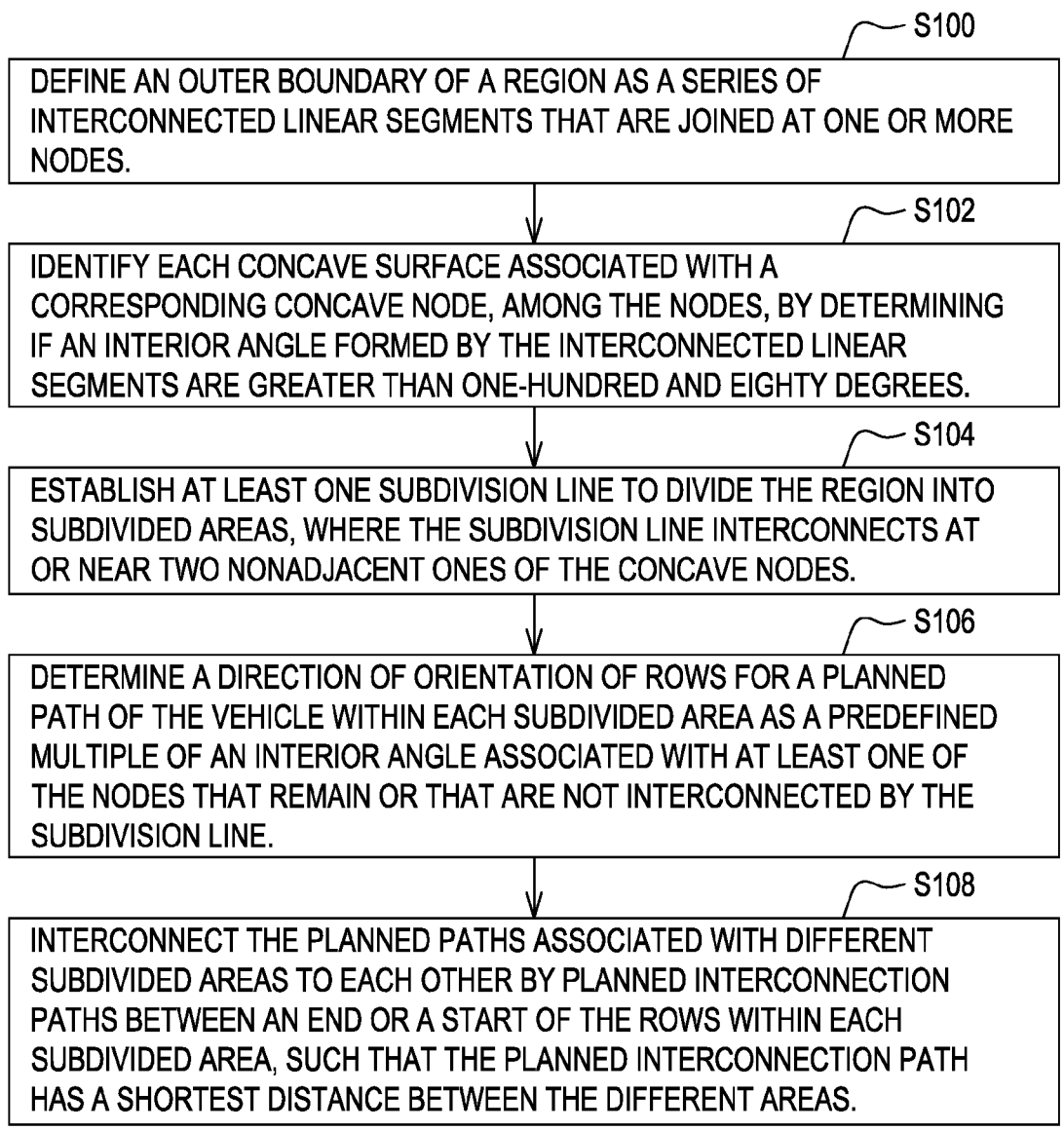
FIG. 4 is a flow chart of a method for determining a planned path of a vehicle.

FIG. 4 illustrates the method for determining a planned path of a vehicle. The method begins in step S100.

In step S100, a boundary definer 16 or the electronic data processing system 10 defines an outer boundary of a region as a series of interconnected generally linear segments that are joined at one or more nodes. Generally linear segments mean segments that are rectilinear or one or more curved segments that can be modeled by or approximated with one or more equivalent straight line segments. Step S100 may be carried out by one or more techniques, which may be applied alternately or cumulatively.

Under a first technique for executing step S100, an operator of a vehicle traverses the outer boundary of the region with a vehicle equipped with a location-determining receiver 30 that periodically or regularly estimates a location of the vehicle, where the data processing system 10 or boundary definer 16 manages the collection and storing of the estimated location as a series of points that lie on the traversed outer boundary. Further, the data processing system 10 or boundary definer 16 models the traversed outer boundary of the region by the series of interconnected linear segments that represent a best fit or approximate fit lying within or on the outer boundary.

Under a second technique for executing step S100, the data processing system 10 or boundary definer 16 models the traversed outer boundary of the region by the series of interconnected linear segments that represent a best fit or approximate fit lying within or on the outer boundary, where the modeling further comprises moving inward one or more nodes of the interconnected linear segments that would otherwise fall outside the outer boundary to fall within or on the outer boundary.

In step S102, the concave surface identifier 18 or the data processing system 10 identifies each concave surface associated with a corresponding node, among the nodes, by determining if an interior angle formed by the interconnected linear segments is greater than a threshold angle (e.g., approximately one-hundred and eighty degrees). In one embodiment, the threshold angle may be user-definable or adjustable, where the default or factor setting is approximately one-hundred and eighty degrees. An interior angle is an angle between two adjacent sides or linear segments of the boundary or of a perimeter of subdivided area, where such angle can be defined by an arc (e.g., an imaginary or virtual arc) that lies entirely within the interior of the region (or subdivided area). For example, if the arc is greater than the threshold angle (e.g., approximately one-hundred and eighty degrees), the concave surface identifier 18 determines that the corresponding node is associated with a concave surface. However, if the arc is less than or equal to the threshold angle (e.g., approximately one-hundred and eighty degrees), the concave surface identifier 18 determines that the corresponding node does not qualify as a concave surface.

In step S104, the subdivision module 20 or data processing system 10 establishes at least one subdivision line to divide the region into subdivided areas (or the subdivided areas or lesser subdivided areas), where the subdivision line interconnects at or near two nonadjacent ones of the nodes. Step S104 may be accomplished by executing one or more procedures that are applied alternatively or cumulatively. Under a first procedure, the subdivision module 20 or the data processing system 10 establishes at least one subdivision line interconnects nodes associated with opposite sides of the outer boundary, where the outer boundary defines a polygon. Under a second procedure, the subdivision module 20 or the data processing system 10 establishes at least one subdivision line interconnects alternate nodes of the outer boundary, where the outer boundary defines a polygon. Alternate nodes are nonadjacent or nonconsecutive nodes as one considers each node of the region in a clockwise or counterclockwise clockwise direction around any polygon, boundary, or series of interconnected generally linear segments within the region.

In step S106, the row orientation module 22 or the data processing system 10 determines a direction (e.g., angular direction with respect to due North, magnetic North or another reference point, such as a particular side of the region) of orientation of rows for a planned path of the vehicle within each subdivided area as a predefined multiple (e.g., fractional multiple or nonzero integer multiple) of an interior angle associated with selected nodes that are not interconnected by the subdivision line. The selected nodes may comprise one or more of the following: (a) corner nodes or convex nodes of the region, the subdivided area, or the lesser subdivided areas, where the corner or convex nodes project outward from the region, the subdivided area, or the lesser subdivided area; and (b) remaining nodes of the subdivided area or the region, where such remaining nodes are not interconnected by any subdivision lines. The data processor 12 of the row orientation module may be programmed or have software instructions to search all possible combinations of selected nodes with different fractional multiples (e.g., in a resolution such as halves, quarters, thirds, eighths or sixteenths) to identify a planned path with the least number of turns, a path with the longest continuous straight or rectilinear components on an aggregate or collective basis, or the planned path that meets a minimum time for completion by a vehicle or that is the shortest overall path.

Step S106 may be executed in accordance with various techniques, which may be applied separately or cumulatively. Under a first technique, the row orientation module 22 or the data processing system 10 determines the direction of orientation uses approximately one-third to two thirds as the predefined multiple of the interior angle. Under a second technique, the row orientation module 22 or the data processing system 10 determines the direction of orientation uses approximately one-half as the predefined multiple of the interior angle.

Under a third technique, the data processor or the row orientation module determines a direction of orientation of a generally parallel array of rows in a predefined relationship (e.g., fractional multiple or non-zero integer multiple) of an interior angle associated with one or more selected nodes (e.g., a remaining node, convex node or a corner node that define corners of the subdivided regions) that are not interconnected by the subdivision line.

Under a fourth technique, the data processor or the row orientation module determines a direction of orientation of a generally parallel array of rows in a predefined relationship, such as fractional multiple ranging from one-third to two-thirds, of an interior angle associated with one or more selected nodes (e.g., a remaining node, convex node or a corner node that define corners of the subdivided regions) that are not interconnected by the subdivision line.

In step S108, the path planning module 24 or data processing system 10 manages interconnection of rows or path segments within and between each subdivided area. Within each subdivided area or lesser subdivided area, the path planning module 24 or the data processing system 10 interconnects the planned paths within subdivided areas to each other by planned interconnection paths between terminations (e.g., at an end or a start of the rows at or near an edge or boundary of a region or subdivided area, or lesser subdivided area) within each subdivided area, such that the overall path length within a subdivided area is shortest, the total aggregate length of all straight path segments within the subdivided area is the longest, or such that the number of vehicle turn segments to connect the linear path segments is minimized.

With respect to interconnections of vehicle paths between subdivided areas or lesser subdivided areas, the path planning module 24 or the data processing system 10 interconnects the planned paths between subdivided areas to each other by planned interconnection paths between terminations (at an end or a start of the rows at or near an edge or boundary of a region or subdivided area, or lesser subdivided area) or nodes within each subdivided area, such that the overall path length within the region is shortest, the total aggregate length of all straight path segments within the region is the longest, or such that the number of vehicle turn segments to connect the linear path segments is minimized.

In one embodiment in the execution of step S108 or one or more earlier steps in the method of FIG. 4, the path planning module 24 or data processing system 10 may encounter one or more material obstacles in the work area or region. Each region or work area will vary with respect to its characteristics and whether or not material obstacles exist or are present. Material obstacles are defined as one or more objects or terrain features that make a portion or area of the region non-traversable, or one or more objects or terrain features that are to be avoided because of possible damage to the vehicle, equipment, personal safety, or other reasons.

In one configuration, the data processing system 10, subdivision module 20 or an obstacle detector 44 may detect an obstacle (e.g., a material obstacle) in or near the subdivision line. The data processing system 10, subdivision module 20 or path planning module 24 may search for the shortest aggregate path distance of multiple linear segments between the detected obstacle and the nonadjacent ones of nodes, where the boundary around the obstacles may be polygonal and composed of intersecting linear segments that are traversable by the vehicle. For example, the path planning modules 24 may have a search algorithm or other program instructions for searching for the shortest aggregate path distance between nodes where there are one or more intervening material obstacles. The data processing system 10, the path planning module 24 or subdivision module 20 may replace the subdivision line with the multiple linear segments (e.g., including some portion of the original subdivision line and some linear segments that skirt around the obstacle boundary or inner boundary of the obstacle) that are associated with the shortest aggregate path distance, consistent with program instructions. For instance, the data processing system 10 is capable of providing or synthesizing an alternate or substitute aggregate path of one or more multiple linear segments to avoid a collision with or entry into a material obstacle, where the alternate or substitute aggregate path may be pre-defined by a user survey of the work area or region, developed incidental to a trial-and-error approach, or another search algorithm of possible aggregate path solutions (of multiple generally linear segments) between two or more nodes that rely upon one or more intermediate nodes that are selected on a trial-and-error approach or based on a map of preselected intermediate nodes.

FIG. 5A through FIG. 5E, inclusive, provide a first illustrative example of a work area or region 500 for a vehicle, consistent with the method of FIG. 4. Like reference numbers in FIG. 5A through FIG. 5E, inclusive, indicate like elements.

Figure 5A:
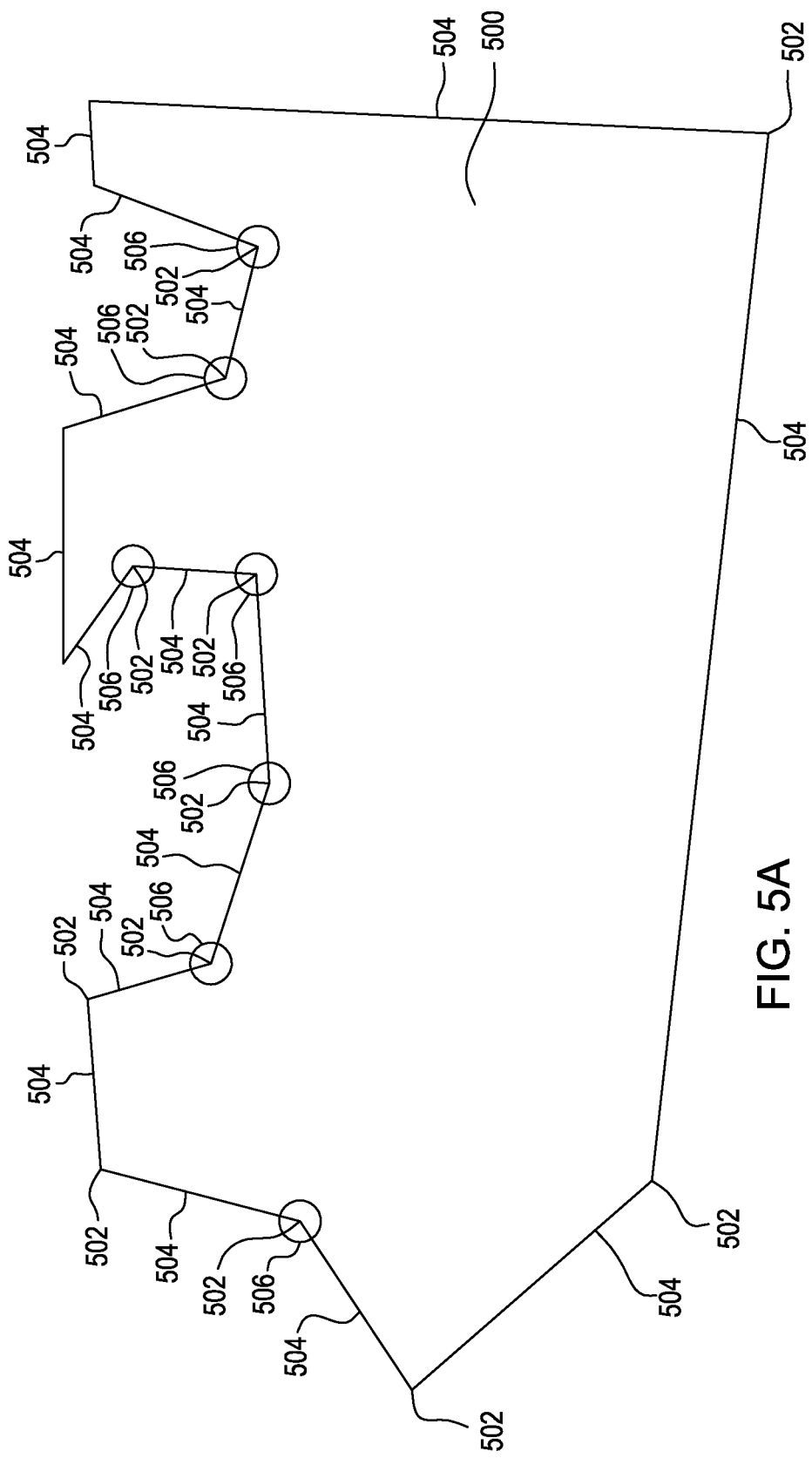
FIG. 5A is a plan view of a first illustrative region with a defined outer boundary.

In FIG. 5A consistent with step S100, a boundary definer 16 or the electronic data processing system 10 defines an outer boundary of a region 500 as a series of interconnected linear segments 504 that are joined at one or more nodes 502. As shown, the region 500 has a generally polygonal shape. The region 500 may represent one or more fields for growing crops, or another work area for the vehicle.

Figure 5B:
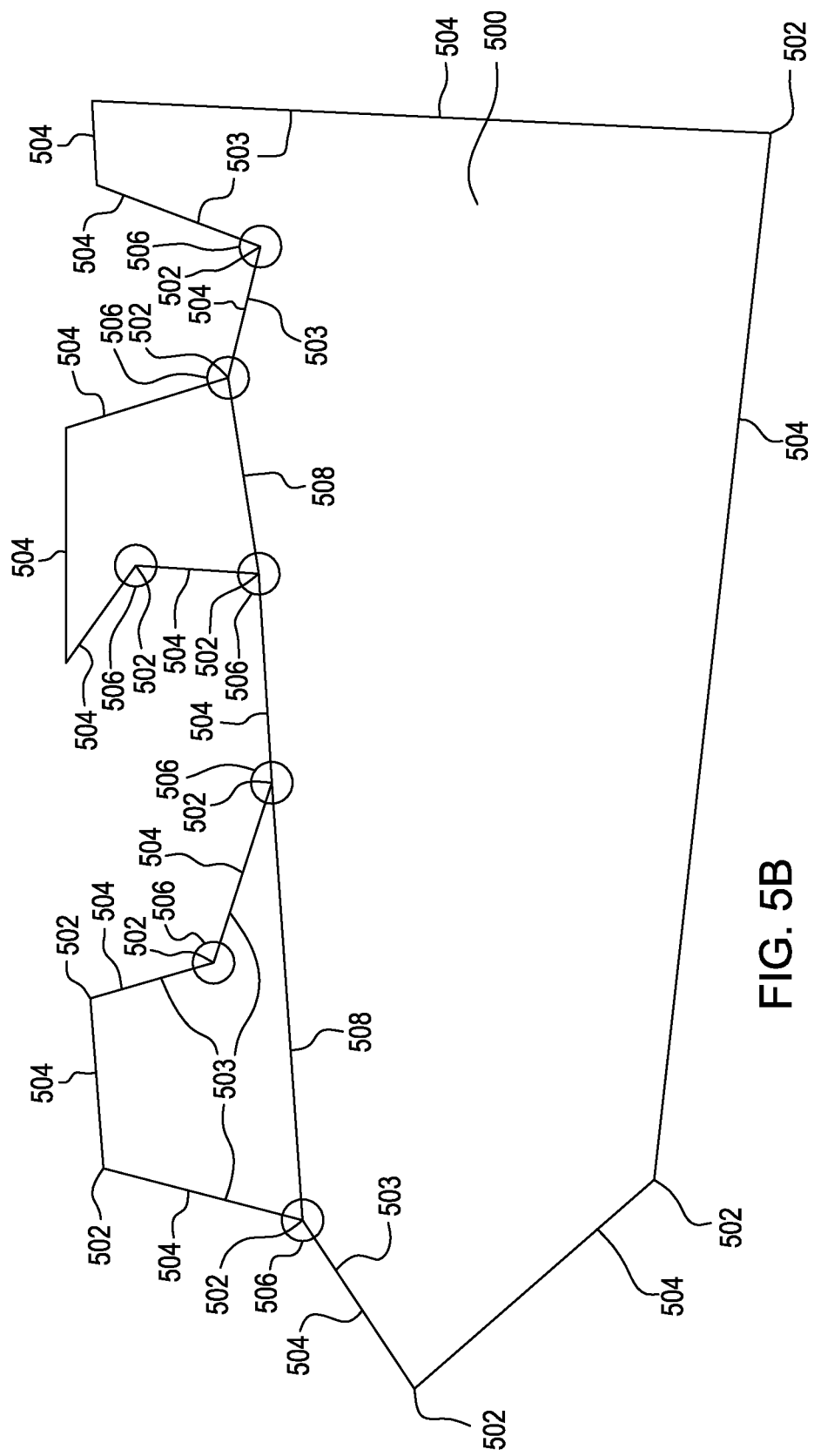
FIG. 5B is a plan view of an illustrative example of identification of concave surfaces or nodes associated with the outer boundary of FIG. 5A.

In FIG. 5B consistent with step S102, the concave surface 506 identifier 18 or the data processing system 10 identifies each concave surface 506 associated with a corresponding concave node, among the nodes 502, by determining if an interior angle formed by the interconnected linear segments 504 are greater than a threshold angle (e.g., approximately one-hundred and eighty degrees). However, if the interior angle within the region is less than the threshold angle, that portion of the boundary or perimeter 503 of the region 500 does not qualify as a concave surface.

Figure 5C:
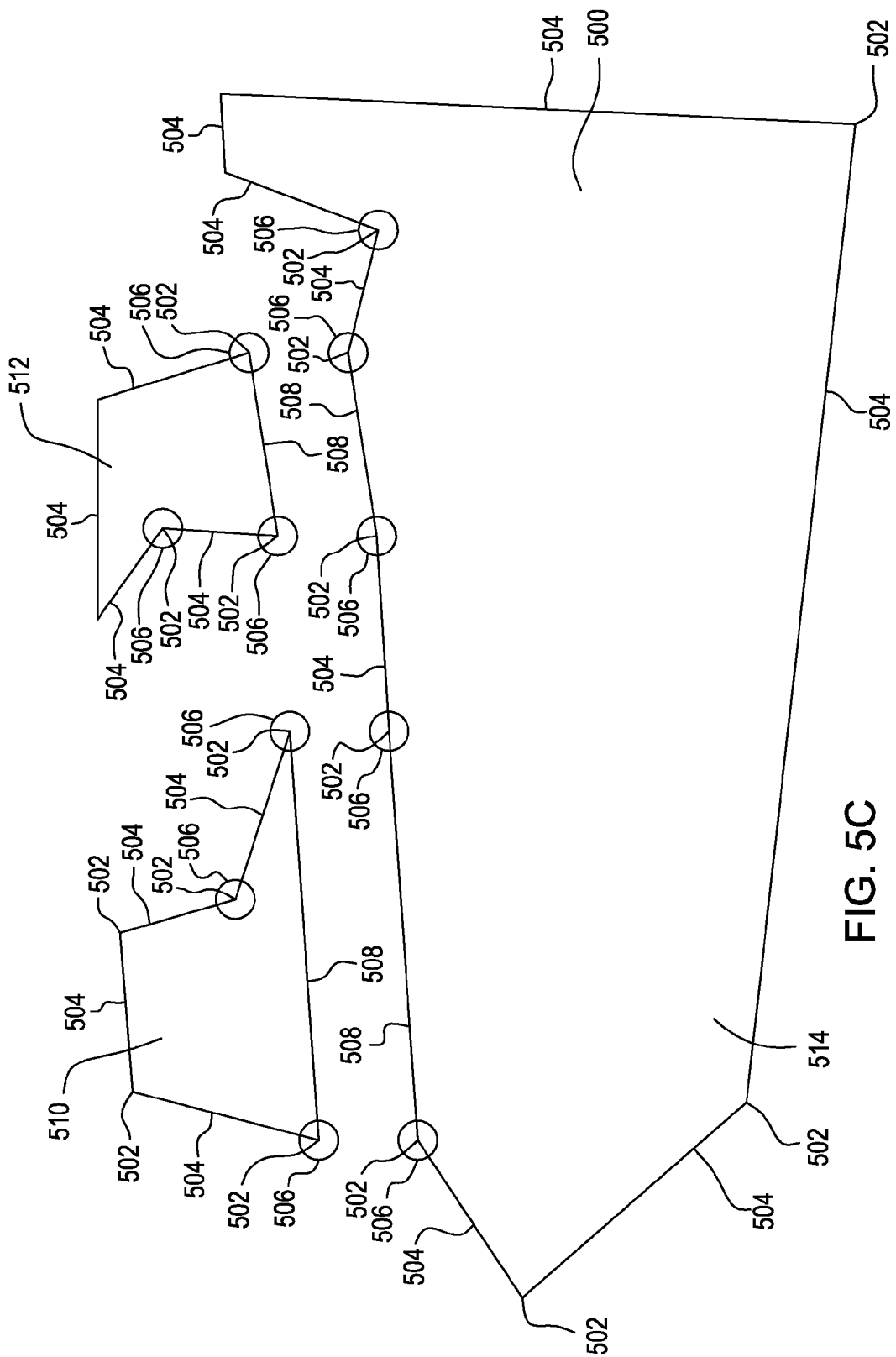
FIG. 5C is a plan view of an illustrative example of establishing subdivision lines to divide the first illustrative region into subdivided areas.

In FIG. 5C consistent with step S104, the subdivision module 20 or data processing system 10 establishes at least one subdivision line 508 to divide the region 500 into subdivided areas (510, 512, and 514), where the subdivision line 508 interconnects at or near two nonadjacent ones (e.g., non-consecutive along the perimeter of the boundary) of the nodes 502. Here, the subdivided areas include first subdivided area 510, second subdivided area 512, and third subdivided area 514, each which can be serviced or traversed separately and serially in a sequential order by a vehicle.

Figure 5D:
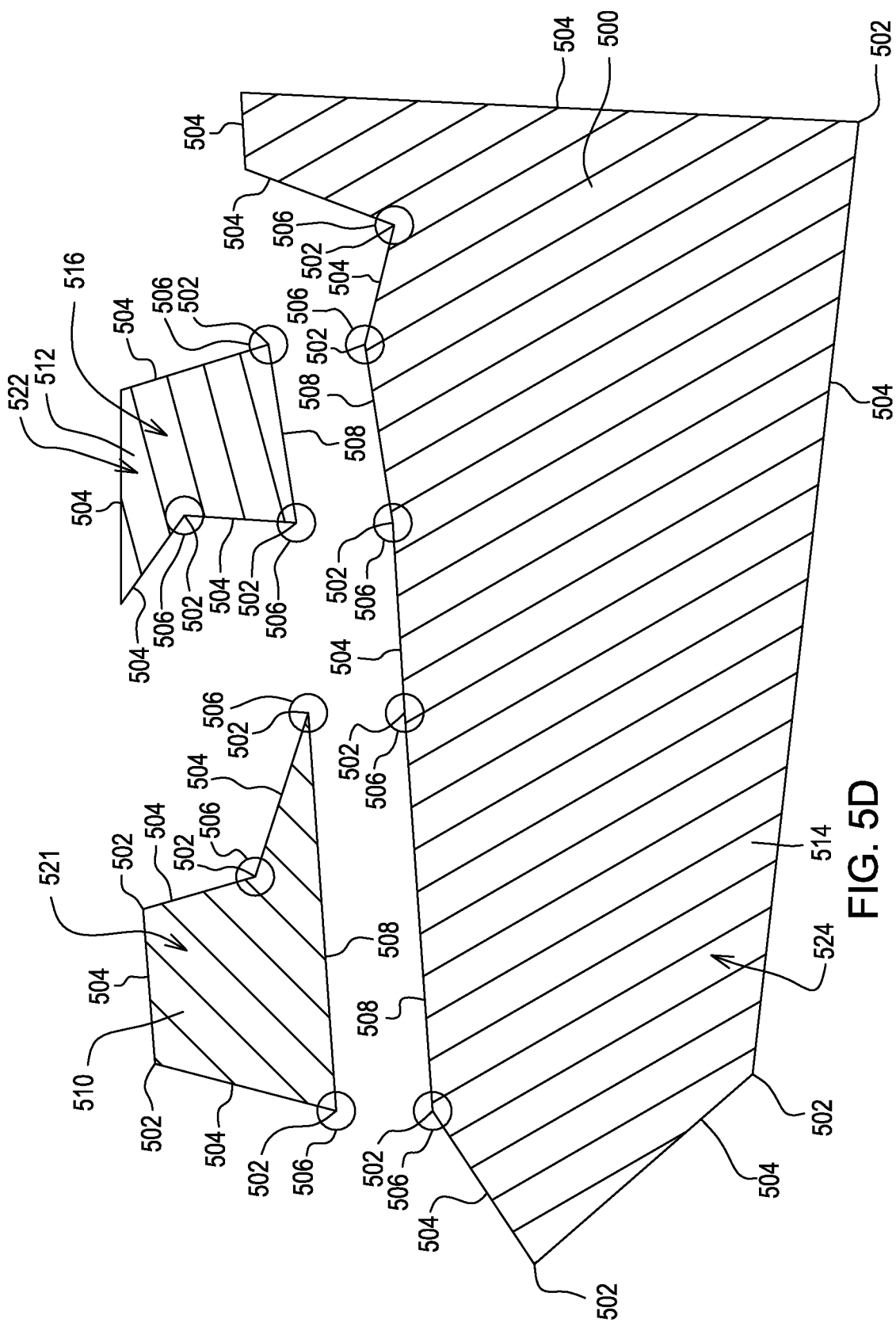
FIG. 5D is a plan view of an illustrative example of determining the direction or orientation of rows for a planned path of the vehicle in the first illustrative region.

In FIG. 5D consistent with step S106, the row orientation module 22 or the data processing system 10 determines a direction of orientation of rows (521, 522, and 524) for a planned path of the vehicle within each subdivided area as a predefined multiple of an interior angle associated with nodes 502 (e.g., at least one of the concave nodes) that are not interconnected by the subdivision line 508. As shown in FIG. 5D, the rows are generally parallel and equally spaced rows, where the spacing is proportional to the vehicle width or swath. For example, the spacing between a centerline of adjacent rows may be approximately one vehicle width or the implement width (e.g., boom width of a sprayer or header width of a combine), less some minimal overall to account for error (e.g., position estimation error of a location-determining receiver 30) or variation on terrain or position of the vehicle.

In FIG. 5E consistent with step S108, the path planning module 24 or data processing system 10 interconnects the rows (or path segments) associated within each different subdivided areas (510, 512 and 514) to each other by planned interconnection paths 520 between an end or a start of the rows within each subdivided area. Further, the path planning module 24 interconnects at least one row from each subdivided area to another row or path associated with another subdivided area such that a planned interconnection path between different subdivided areas has a shortest distance between the different subdivided areas. Such interconnection paths between subdivided areas may be completed in a clockwise, counterclockwise manner or on a scheduled user-preferential order of completion for each subdivided area. In one embodiment, such interconnection paths may interconnect nodes that were associated with concave surfaces, for example.

FIG. 6A through FIG. 6E, inclusive, provide a second illustrative example of a work area or region 600 for a vehicle, consistent with the method (e.g., and successive steps) of FIG. 4. Like reference numbers in FIG. 6A through FIG. 6E, inclusive, indicate like elements.

Figure 6A:
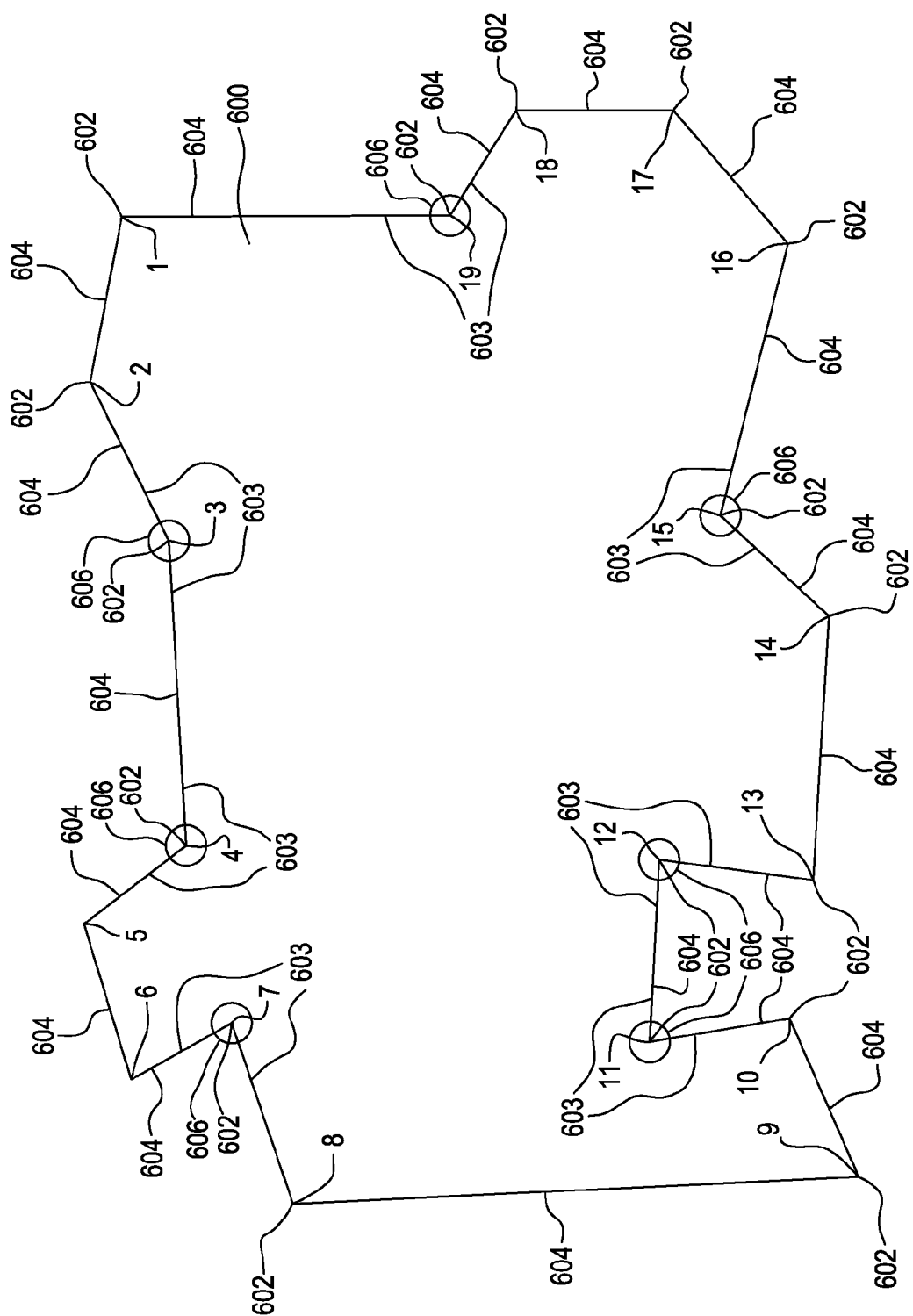
FIG. 6A is a plan view of a second illustrative region with a defined outer boundary.

In FIG. 6A consistent with step S100, a boundary definer 16 or the electronic data processing system 10 defines an outer boundary of a region 600 as a series of interconnected linear segments 604 that are joined at one or more nodes 602. As shown, the region 600 has a generally polygonal shape. The region 600 may represent one or more fields for growing crops or another work area for the vehicle.

Figure 6B:
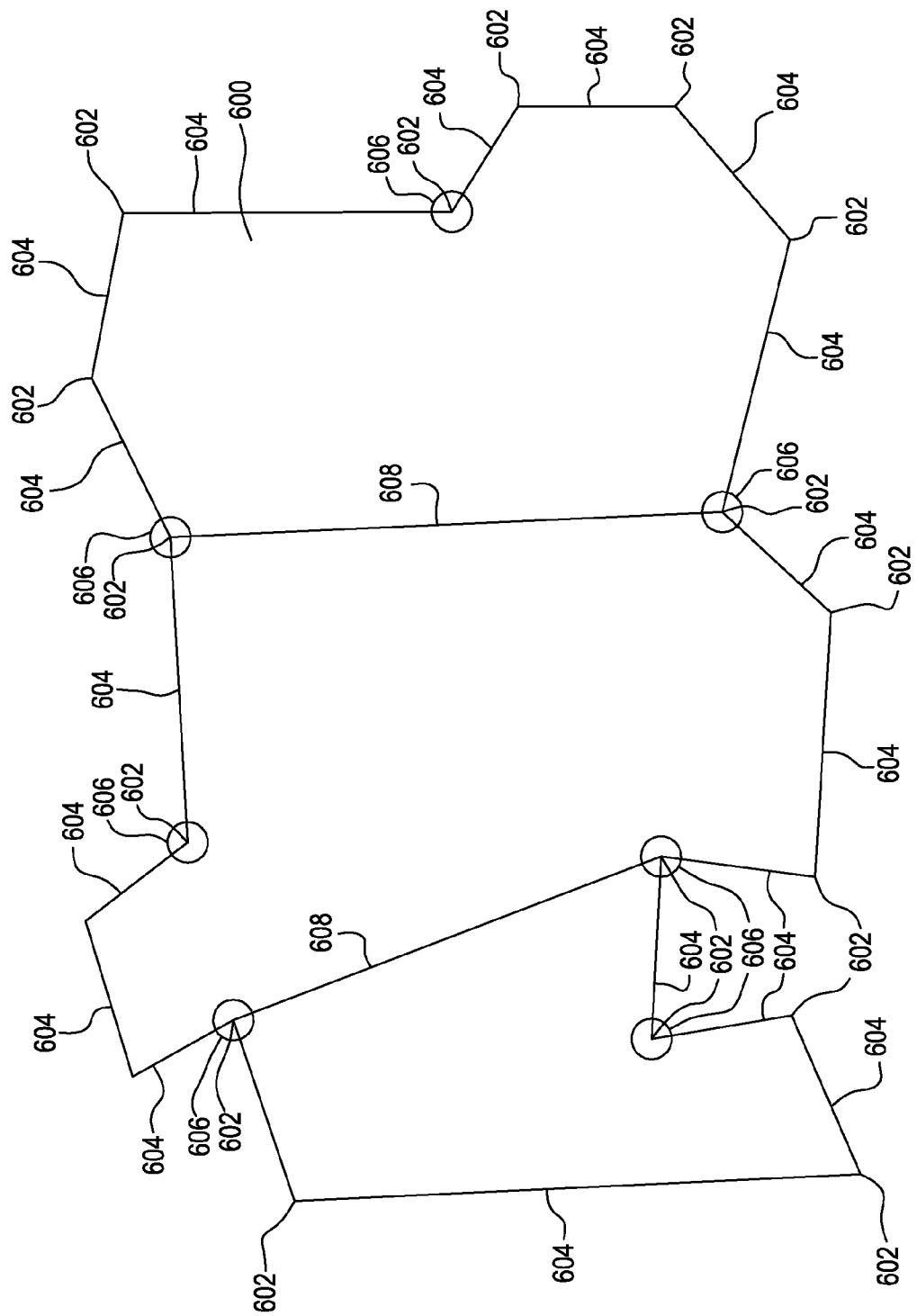
FIG. 6B is a plan view of an illustrative example of identification of concave surfaces or nodes associated with the outer boundary of FIG. 6A.

In FIG. 6A and in FIG. 6B consistent with step S102, the concave surface 606 identifier 18 or the data processing system 10 identifies each concave surface 606 associated with a corresponding concave node, among the nodes 602, by determining if an interior angle formed by the interconnected linear segments 604 are greater than a threshold angle (e.g., one-hundred and eighty degrees). If the interior angle is greater than a threshold angle (e.g., one hundred and eighty degrees), the interior angle qualifies as a concave surface 606 of a perimeter 603 of the region 600. The concave node is a node associated with a vertex of the concave surface 606 of a perimeter 603 or the region. For example, in FIG. 6A the nodes are labeled consecutively from 1 to 19, where nodes 3, 4, 7, 11, 12, 15 and 19 are concave nodes.

Figure 6C:
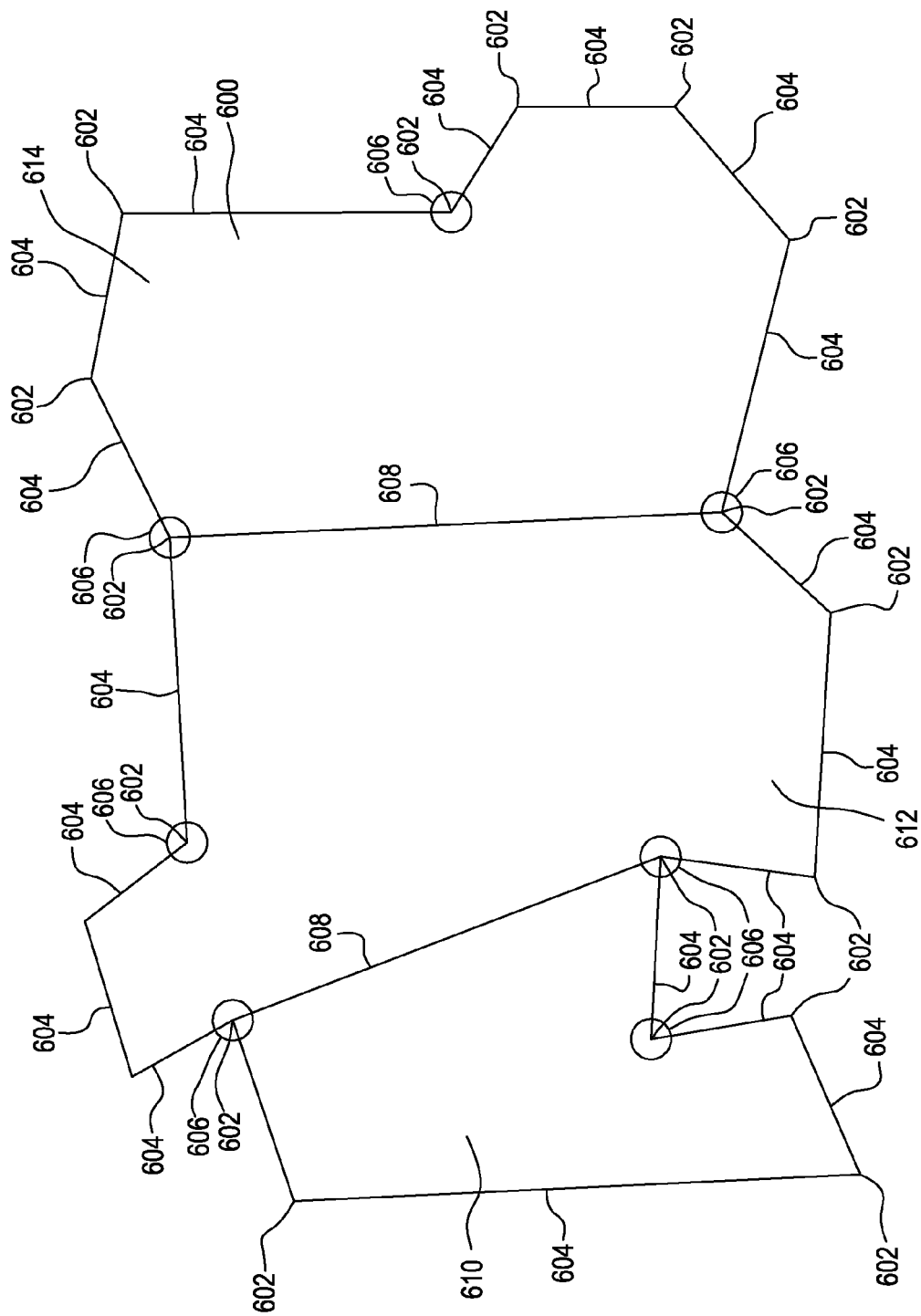
FIG. 6C is a plan view of an illustrative example of establishing subdivision lines to divide the second illustrative region into subdivided areas.

In FIG. 6C consistent with step S104, the subdivision module 20 or data processing system 10 establishes at least one subdivision line 608 to divide the region 600 into subdivided areas (610, 612, and 614), where the subdivision line 608 interconnects at or near two nonadjacent ones (e.g., non-consecutive along the perimeter of the boundary of the region 600) of the concave nodes 602. Here, the subdivided areas include first subdivided area 610, second subdivided area 612, and third subdivided area 614, each which can be serviced separately in a sequential order by a vehicle.

The interconnection between the nodes can be evaluated in a clockwise manner starting from an initial concave node (e.g., node 3). For example, concave node 3 can be connected to concave node 15, while skipping concave node 19; concave node 12 can be connected to concave node 7, while skipping node 11. Concave node 3 and convex node 3 are not connected because both nodes are not concave. Similarly, concave node 4 and convex node 6 are not connected because both are not concave.

Figure 6D:
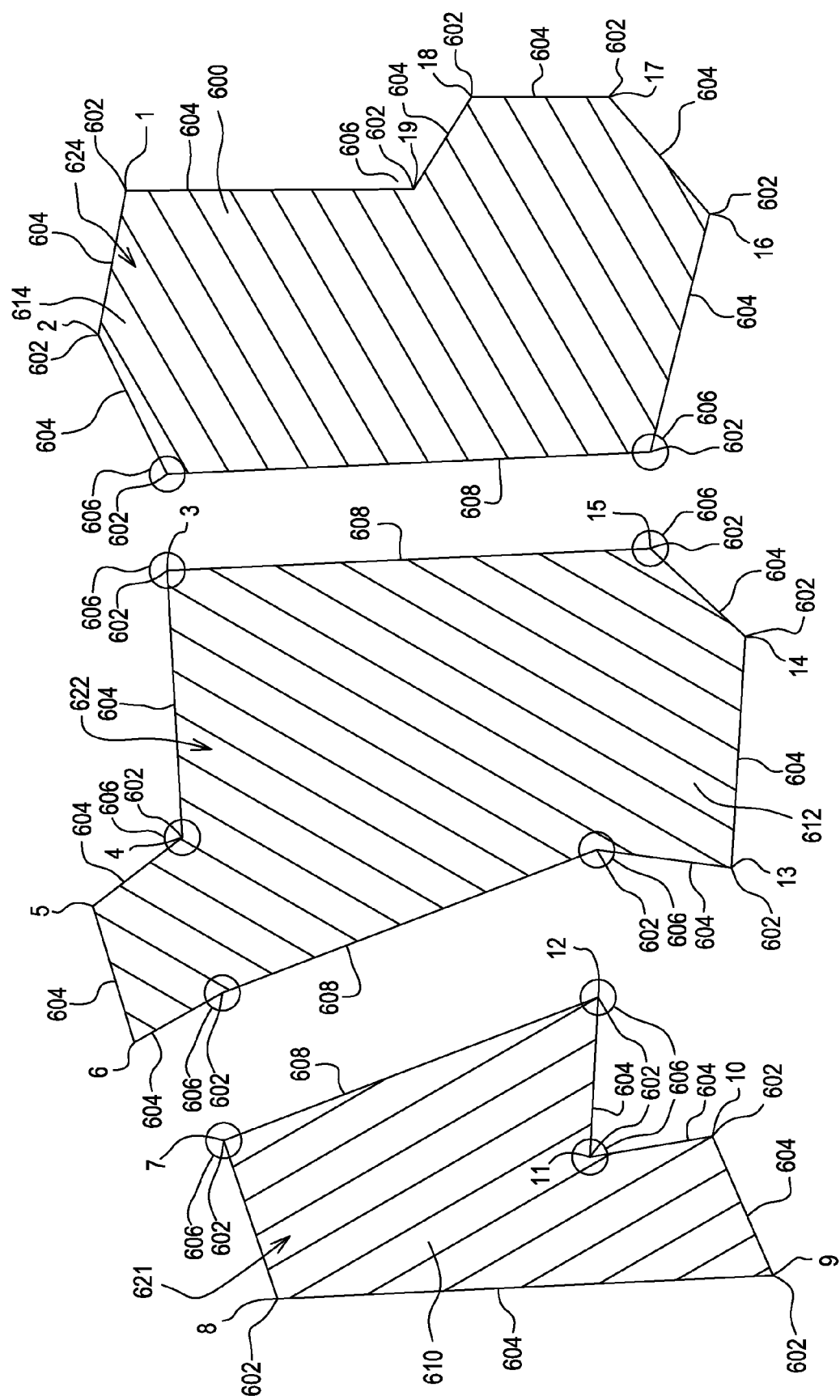
FIG. 6D is a plan view of an illustrative example of determining the direction or orientation of rows for a planned path of the vehicle in the second illustrative region.

In FIG. 6D consistent with step S106, the row orientation module 22 or the data processing system 10 determines a direction of orientation of rows (621, 622, and 624) for a planned path of the vehicle within each subdivided area (610, 612 and 614) as a predefined relationship (e.g., fractional multiple, a non-zero integer multiple, or a non-zero integer divisor) of an interior angle associated with at least one of the nodes 602 that remain or that are not interconnected by the subdivision line 608. For example, any corner node that defines an outer corner of each subdivided area (610, 612, and 614) or any corner node that projects outward from an interior of the region 600 may be used to define the direction of orientation of the generally parallel rows within the corresponding subdivided area, where the interior corner angle is multiplied by a fractional multiple (e.g., ½) or divided by a non-zero integer multiple.

Although other embodiments fall within the scope of the claims with different interior angles, row orientations, regions, and subdivided areas, the following illustrative example of FIG. 6D is described in greater detail for exemplary purposes. For the first subdivided area 610 in FIG. 6D, the planned direction of the row of the vehicle is the interior angle of concave node 11 multiplied by one-half, or another suitable multiplier. For instance, if the lower right concave corner (or concave node 11) has an interior angle of approximately 107 degrees, that results in a row orientation of approximately 53.5 degrees from either linear segment 604 associated with the interior angle, where the fractional multiplier is approximately one-half.

For the second subdivided area 612 in FIG. 6D, the planned direction of the row of the vehicle is the interior angle of concave node 4 multiplied by one-half, or another suitable multiplier. For instance, the concave node 4 has an interior corner angle of approximately 86 degrees, that results in a row orientation of approximately 43 degrees for either linear segment associated with the interior angle, where the fractional multiplier is approximately one-half.

For the third subdivided area 614 in FIG. 6D, the planned direction of the row of the vehicle is the interior angle of concave node 19 multiplied by one-half, or another suitable multiplier. For instance, the concave node 19 has an interior angle of approximately 100 degrees, which results in a row orientation of approximately 50 degrees from either linear segment 604 associated with the interior angle, where the fractional multiplier is approximately one-half.

As shown in FIG. 6D, the rows are generally parallel and equally spaced rows, where the spacing is proportional to the vehicle width or swath. In practice, the row orientation module 22 or the data processing system 10 may review or test each possible candidate row orientation for each possible permutation of the candidate corner node (or concave node) and its corresponding interior angle to determine which row orientation qualifies as a selected or resultant row orientation for each corresponding subdivided area, where the search space may be limited to certain ranges of fractional multipliers, non-zero integer multipliers, or non-zero integer divisors.

Figure 6E:
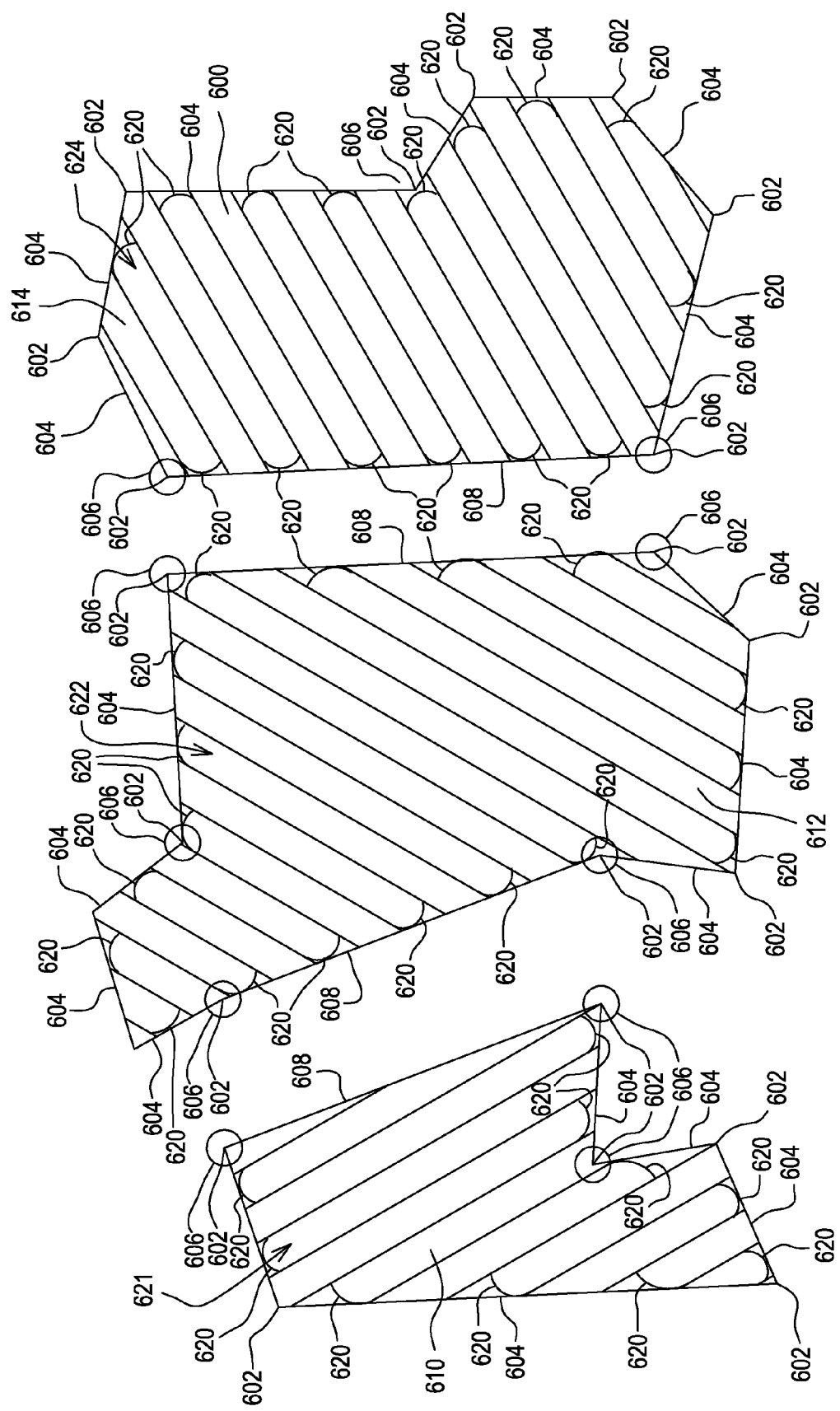
FIG. 6E is a plan view of an illustrative example of interconnecting the planned paths associated with different subdivided areas in the second illustrative region.

In FIG. 6E consistent with step S108, the path planning module 24 or data processing system 10 interconnects the rows (or path segments) within each of the different subdivided areas (610, 612 and 614) to each other by planned interconnection paths 620 (or turns) at row terminations (e.g., between an end or a start of the rows within each subdivided area). With each subdivided area, the interconnection paths 620 or turns may be simple arcs, keyhole turns, row-skipping turns, or other turns that a vehicle is capable of making given the applicable row spacing between adjacent rows or alternate rows. Between different subdivided areas, the path planning module 24 interconnects at least one row from each subdivided area to another row or path associated with another subdivided area at row terminations or at nodes associated with different subdivided areas.

In one embodiment, the path planning module 24 or the data processing module 10 searches for the combination of path interconnections 620 within and between subdivided areas to accomplish one or more of the following: such that a planned interconnection paths between different subdivided areas have a shortest distance between the different subdivided areas, such that the aggregate path to cover the region is minimized or has the shortest aggregate path length, such that the aggregate length of straight row sections, or generally linear path sections for the vehicle is maximized, or such that the aggregate length of turns or interconnection 620 is minimized.

Figure 7A:
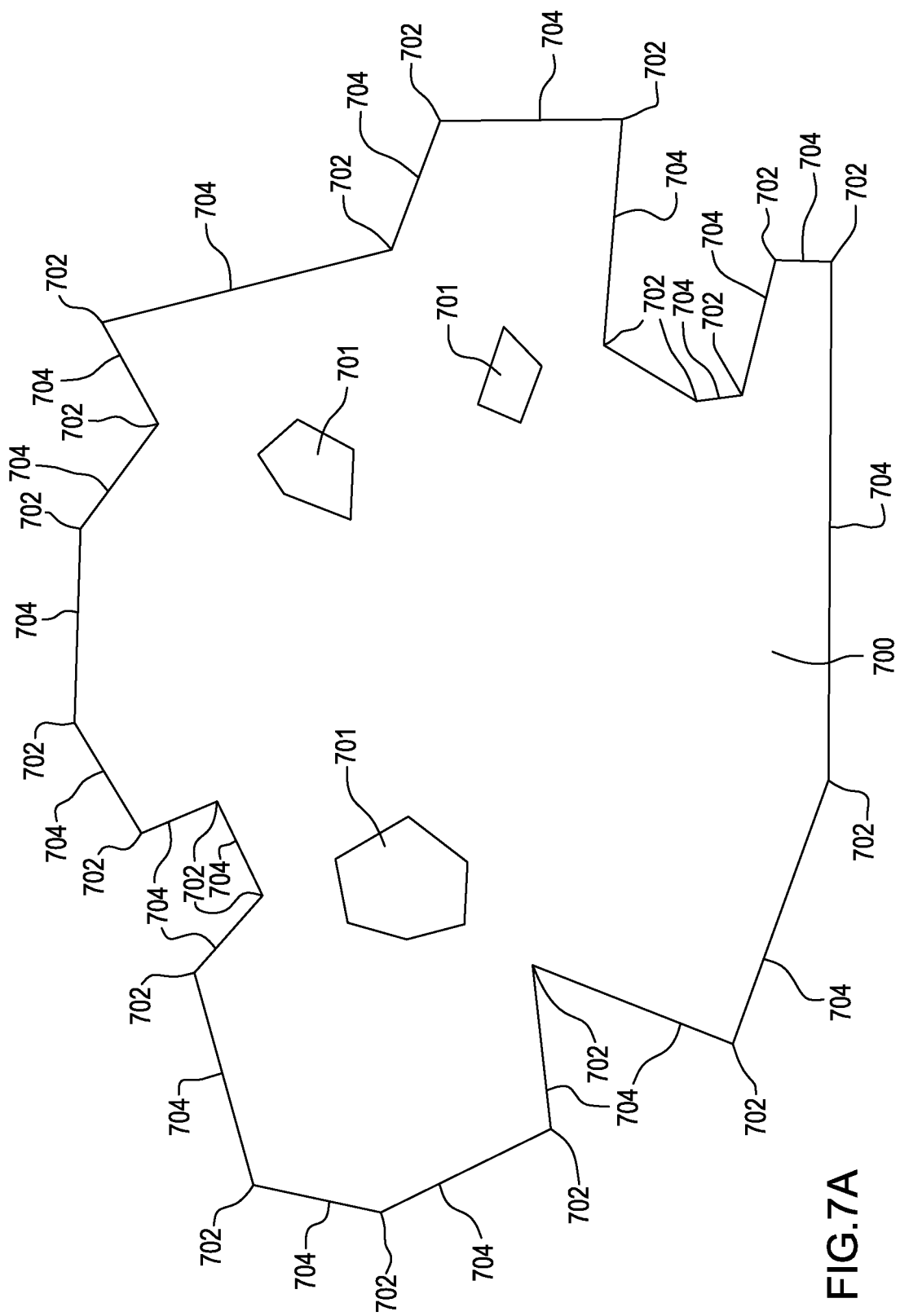
FIG. 7A is a plan view of a third illustrative region with a defined outer boundary, and in which multiple inner boundaries or keep-out areas are defined.
Figure 7B:
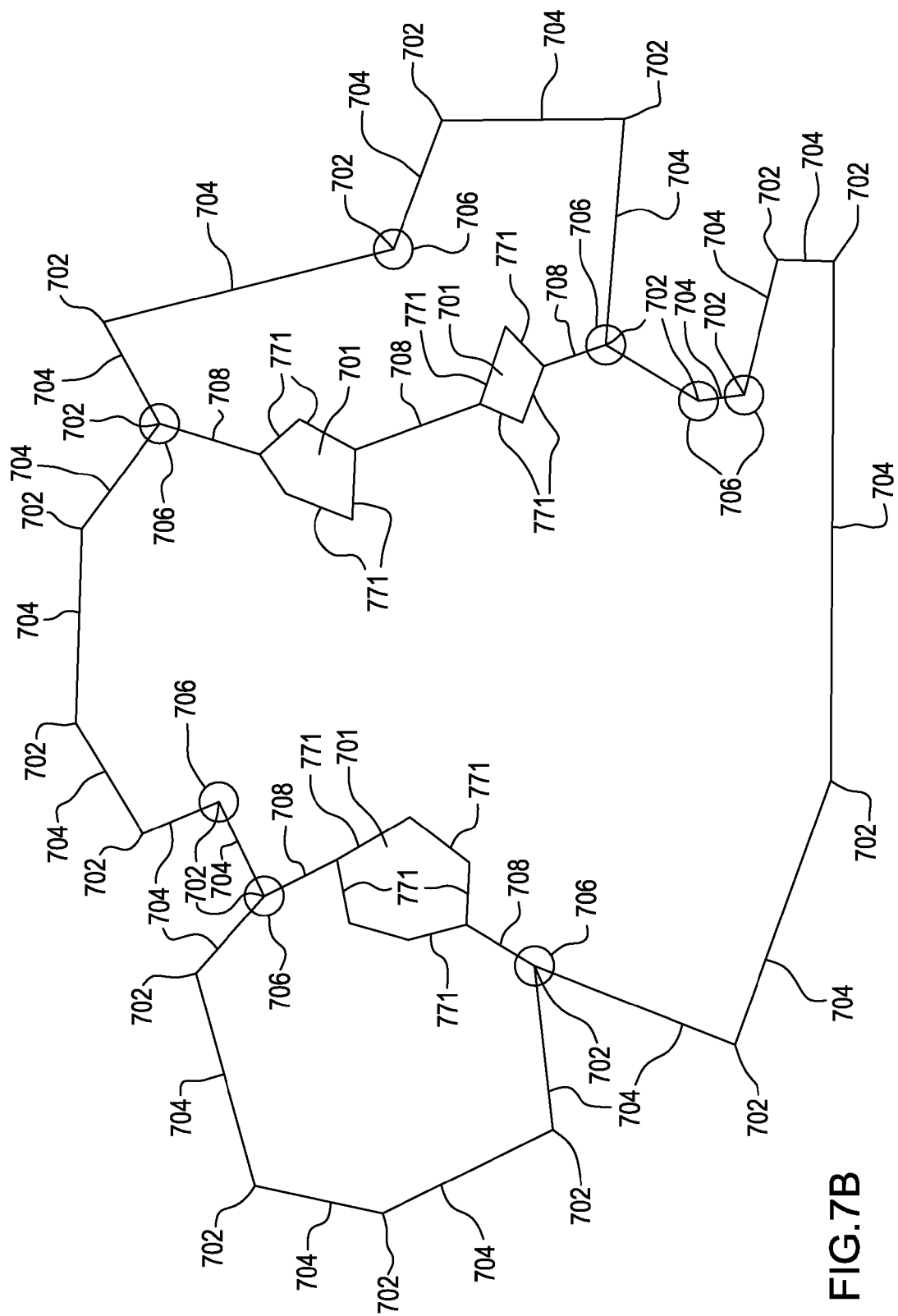
FIG. 7B is a plan view of an illustrative example of identification of concave surfaces or nodes associated with the outer boundary of FIG. 7A.

FIG. 7A through FIG. 7H, inclusive, provide a third illustrative example of a work area or region 700 for a vehicle with one or more internal obstacles 701, consistent with the method (e.g., and successive steps) of FIG. 4. The internal obstacles 701 may comprise one or more of the following items: un-traversable regions of rugged or impassable terrain, such as water features, boulders, sink-holes, trees, bushes, vegetation, building structures, or other objects. Here, as best illustrated in FIG. 7B, each obstacle is defined as or bounded by a generally polygonal obstruction with a number of interconnected generally linear sides 771. Like reference numbers in FIG. 7A through FIG. 7H, inclusive, indicate like elements.

In FIG. 7A consistent with step S100, a boundary definer 16 or the electronic data processing system 10 defines an outer boundary of a region 700 as a series of interconnected linear segments 704 that are joined at one or more nodes 702. As shown, the region 700 has a generally polygonal shape. The region 700 may represent one or more fields for growing crops or another work area for the vehicle.

In FIG. 7B consistent with step S102, the concave surface identifier 18 or the data processing system 10 identifies each concave surface 706 associated with a corresponding concave node, among the nodes 702, by determining if an interior angle formed by the interconnected linear segments 704 are greater than a threshold angle (e.g., approximately one-hundred and eighty degrees). If the interior angle is greater than the threshold angle (e.g., approximately one-hundred and eighty degrees), the interior angle and associated linear segments 704 qualify as a concave surface 706.

Figure 7C:
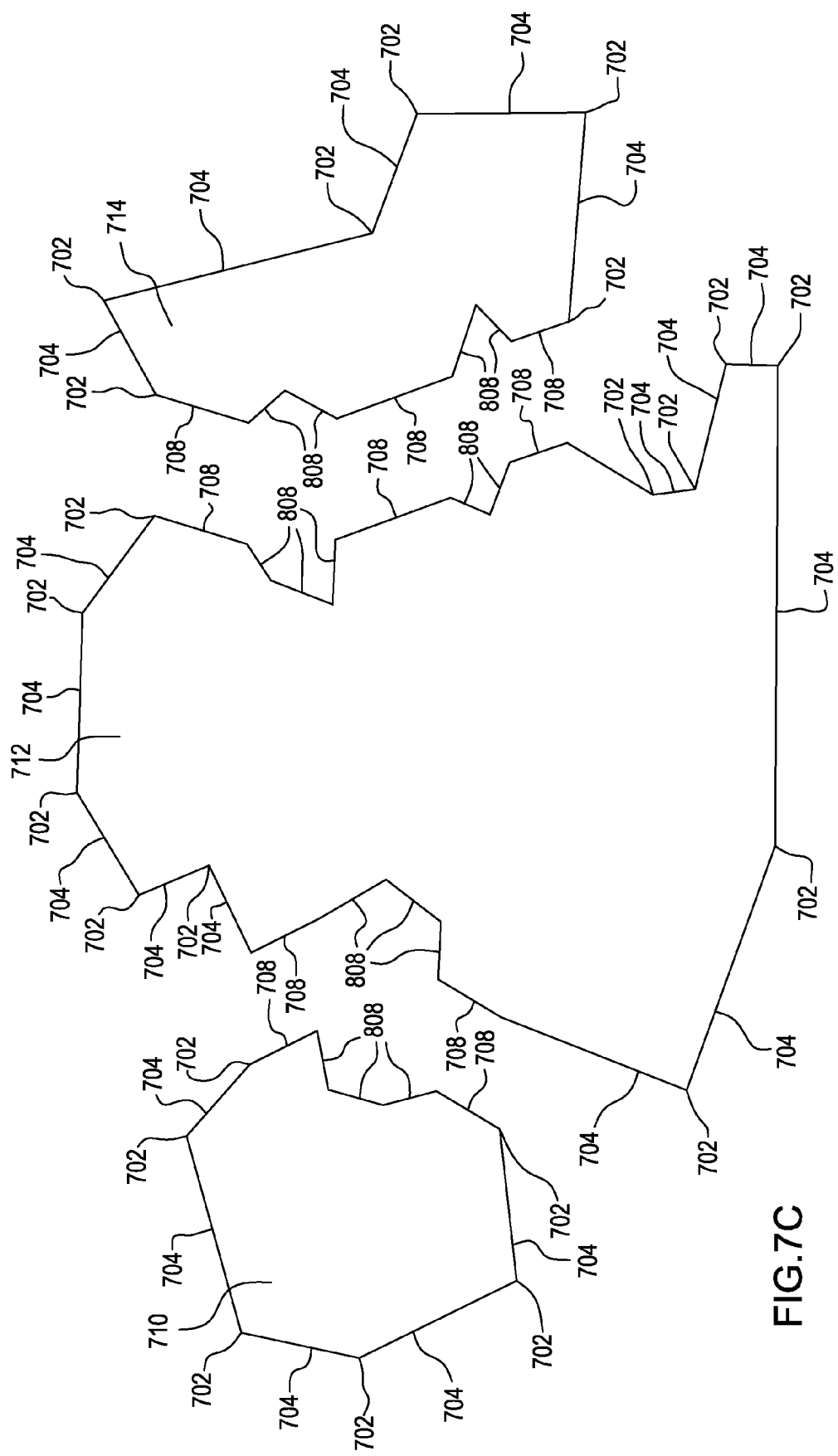
FIG. 7C is a plan view of an illustrative example of establishing subdivision lines to divide the third illustrative region into subdivided areas.

In FIG. 7B and in FIG. 7C consistent with step S104, the subdivision module 20 or data processing system 10 establishes at least one subdivision line 708 to divide the region 700 into subdivided areas (710, 712 and 714), where the subdivision line 708 interconnects at or near two nonadjacent ones of the concave nodes 702 (e.g., of the nodes associated with the concave surface 706) on the outer boundary of the region 700. Here, in the illustrative example of FIG. 7C, the subdivision module 20 or data processing system 10 defines one or more subdivision lines 708 to interconnect with one or more obstacle nodes or with one or more sides 771 of obstacles that intervene between the nonadjacent ones of the nodes 702 on the outer boundary of the region 700. In FIG. 7C, the sides 771 of the obstacles 701 are traversable by the vehicle and have sufficient clearance allowance for the vehicle (e.g., of a given vehicle width or implement width, whichever is greater) to avoid contact with the closest obstacle 701. The subdivision lines 808 associated with the sides of the obstacles 701 interconnect with one or more subdivision lines 708 to interconnect at or near two nonadjacent ones of the nodes 702 (e.g., of the nodes associated with the concave surface 706) on the outer boundary of the region 700.

Figure 7D:
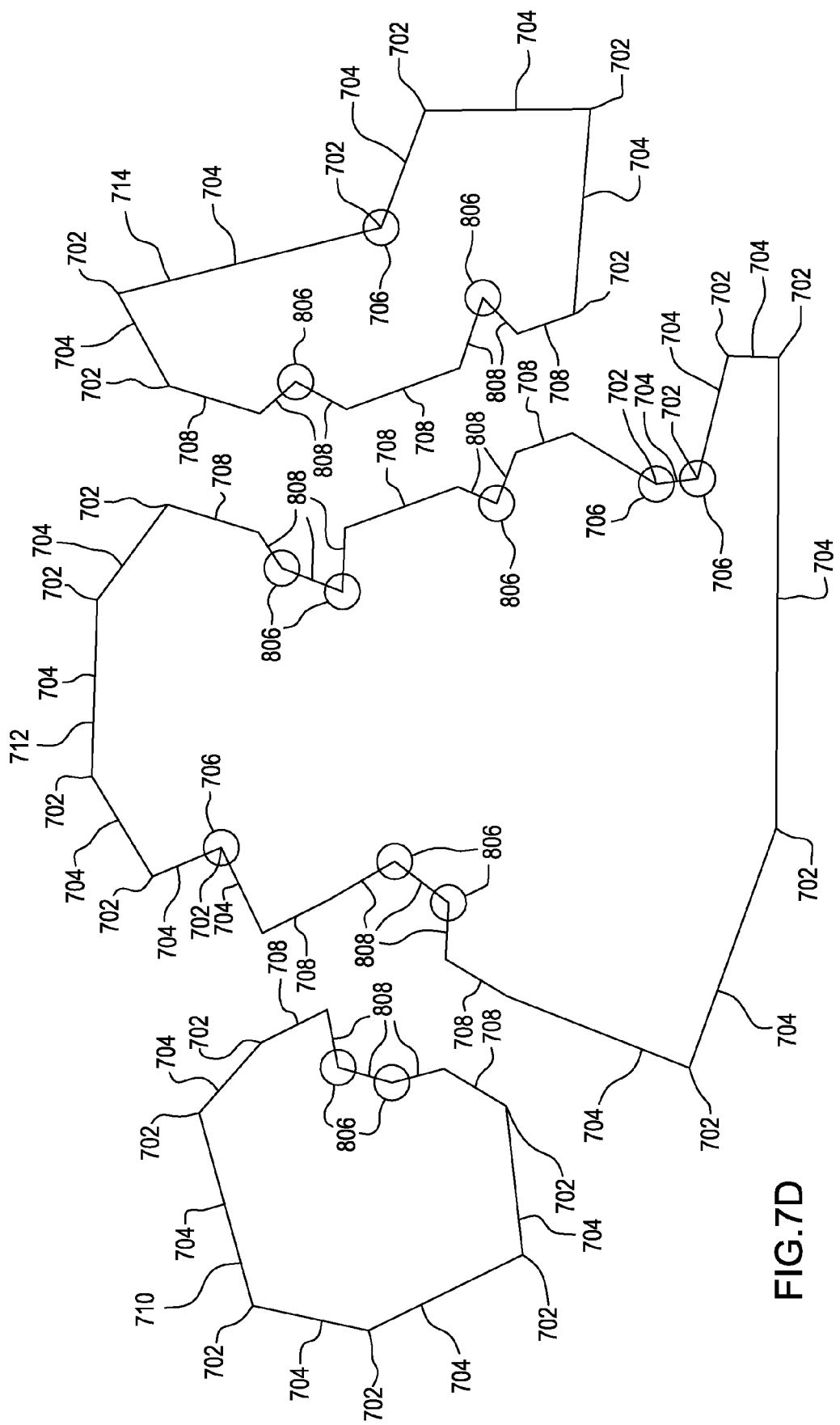
FIG. 7D is a plan view of an illustrative example of identification of supplemental concave surfaces associated with nodes along the outer boundary of subdivided areas.

In FIG. 7D, consistent with executing (or redoing) step S102 after the subdivided areas (710, 712, 714) are identified and subdivided, the concave surface identifier 18 or the data processing system 10 identifies each supplemental concave surface 806 associated with a corresponding concave node, among the nodes 702, by determining if an interior angle formed by the interconnected linear segments 704 are greater than a threshold angle (e.g., approximately one-hundred and eighty degrees). The supplemental concave surfaces 806 are associated with the generally linear segments or obstacle subdivision lines 808 that track around the obstacles 701.

Figure 7E:
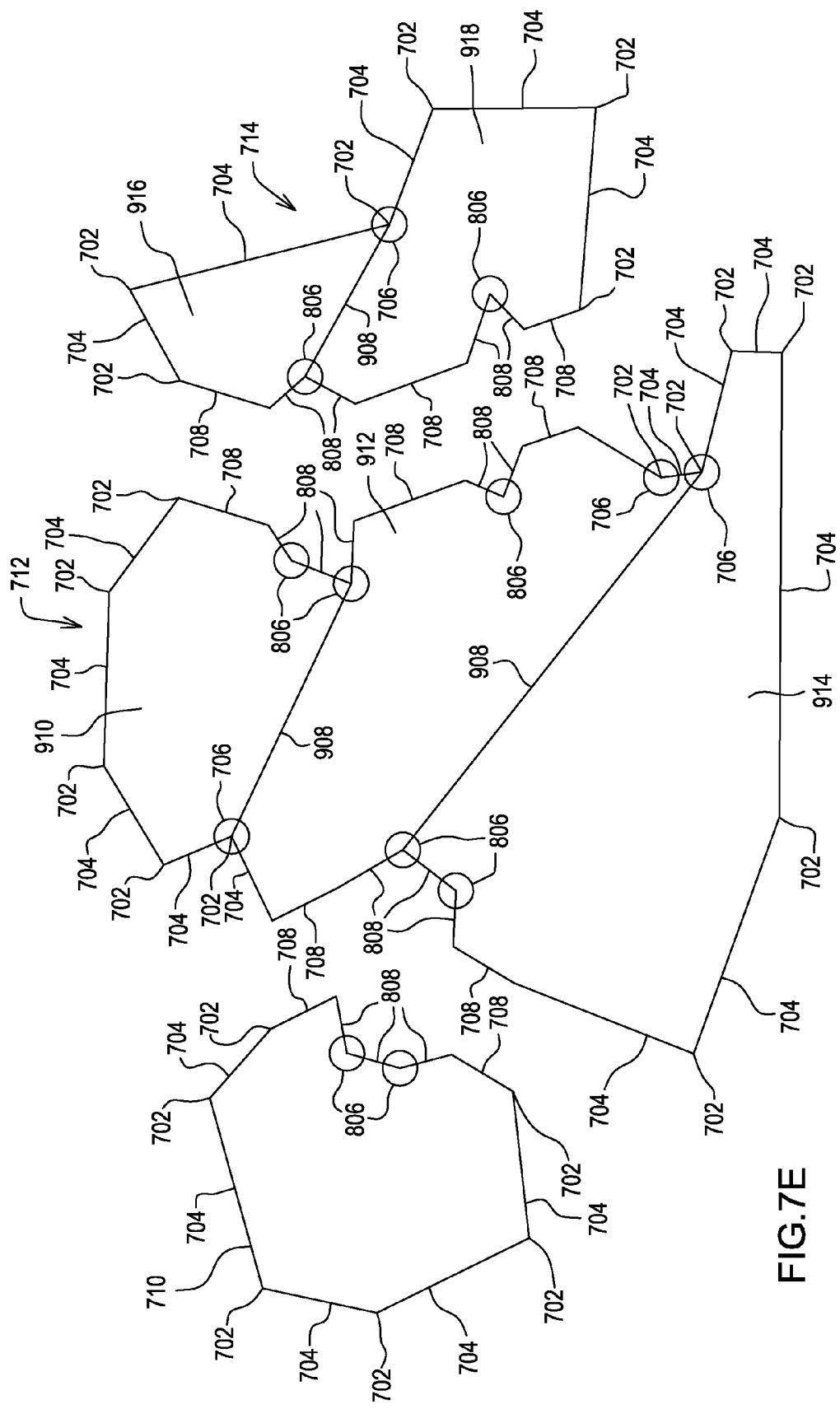
FIG. 7E and FIG. 7F are plan views of an illustrative example of establishing and applying additional subdivision lines to divide the subdivided areas into lesser subdivided areas.
Figure 7F:
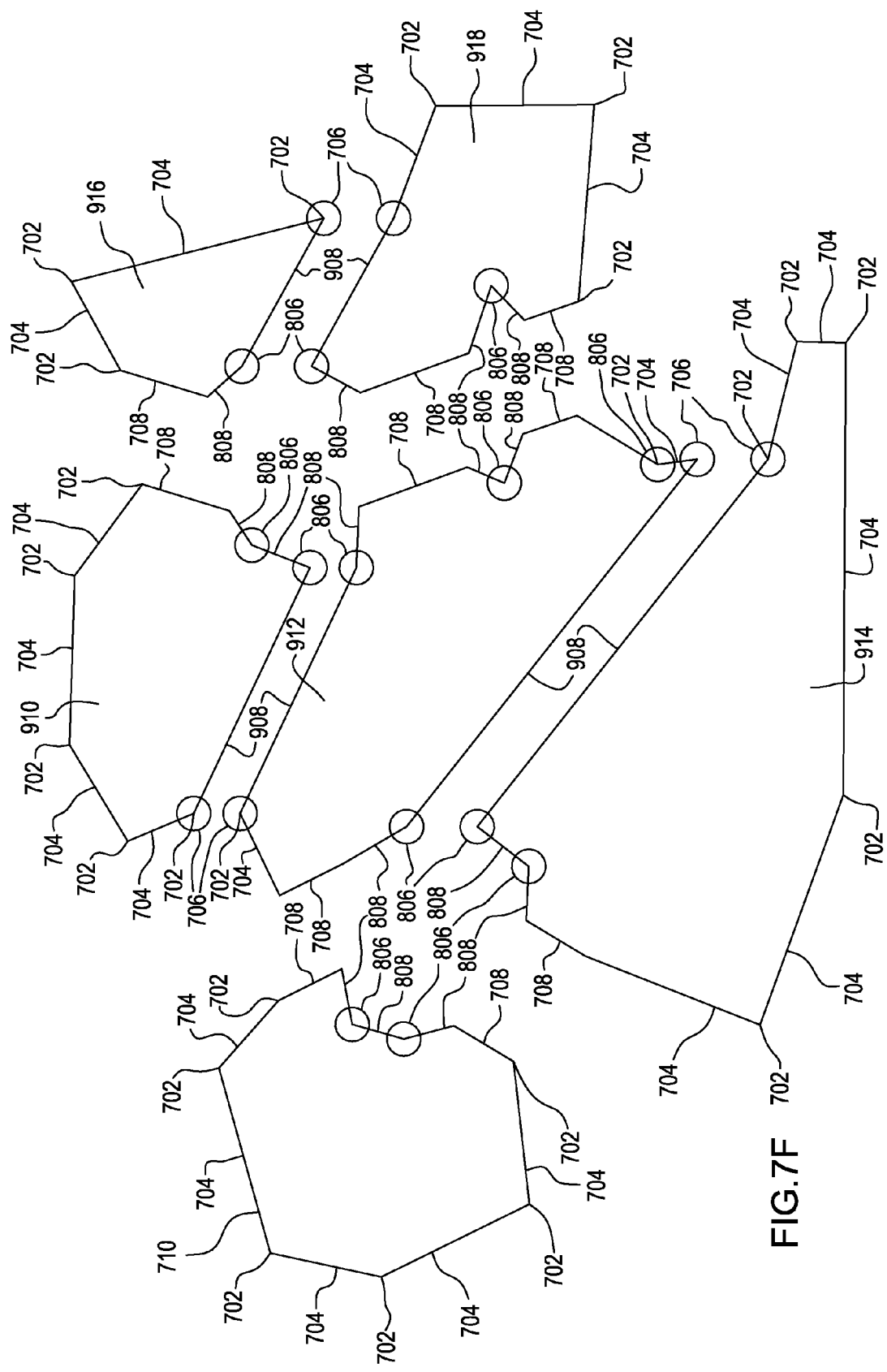

In FIG. 7E and FIG. 7F with executing (or redoing) step S104 after the subdivided areas (710, 712, 714) are identified and subdivided, the subdivision module 20 or data processing system 10 establishes at least one additional subdivision line 908 to divide the region 700 (e.g., subdivided areas 710, 712 and 714) into lesser subdivided areas (910, 912, 914, 916 and 918), where the subdivision line 708 interconnects at or near two nonadjacent ones of the concave nodes 702. Here, in the illustrative example of FIG. 7E and FIG. 7F, the subdivision module 20 or data processing system 10 defines one or more additional subdivision lines 908 to interconnect with the concave nodes associated with subdivision lines 808 (near obstacles that intervene between the nonadjacent ones of the nodes 702). For example, the additional subdivision lines 908 divide subdivided area 712 into lesser subdivided areas (910, 912 and 914); additional subdivision lines 908 divided subdivided area 714 into lesser subdivided areas (916 and 918), and subdivided area 710 is retained without further subdivision. The subdivision module 20 or data processing system 10 does not further subdivide subdivided area 710 because at least two concave surfaces on opposite sides of the subdivided area 710 are not present. Conversely, the subdivision module 20 or data processing system 10 decides that it is appropriate to further subdivide or divide a subdivided area into a lesser subdivided area where the subdivided area is associated with one or more concave surfaces 806 associated with obstacles 701 or the generally rectilinear sides 771 of the obstacles.

In FIG. 7G consistent with step S107, the row orientation module 22 or the data processing system 10 determines a direction of orientation of rows (726, 728, 730, 732, 734, and 736) for a planned path of the vehicle within each subdivided area (710) and each lesser subdivided area (910, 912, 914, 916 and 918). For example, the direction of orientation of the rows may be defined as a predefined multiple (e.g., factional multiple, non-zero integer multiple, or a non-zero integer divisor) of an interior angle associated with at least one concave nodes 702 that remain or that are not interconnected by the subdivision line 708 or subdivision line 808.

For example, any corner node that defines an outer corner of each subdivided area (710, 910, 912, 914, 916 and 918) or any corner node that projects outward from an interior of the region 700 may be used to define the direction of orientation of the generally parallel rows within the corresponding subdivided area, where the interior corner angle is multiplied by a fractional multiple (e.g., ½) or divided by a non-zero integer multiple. In one example, the row orientation module 22 or the data processing system 10 may use the top right corner of lesser subdivided area 910 and lesser subdivided area 912 to derive the row orientation (e.g., row orientation angle) within lesser subdivided area 910 and lesser subdivided area 912, respectively, by multiplying the interior corner angle of the lesser subdivided area (910, 912) by a fractional multiple (e.g., ½). In another example, the row orientation module 22 or the data processing system 10 may use the lower right corner of lesser subdivided area 914 to derive the row orientation (e.g., row orientation angle) within lesser subdivided area 914 by multiplying the interior corner angle of the lesser subdivided area 914 by a fractional multiple (e.g., ½). In yet another example, the row orientation module 22 or the data processing system 10 may use the leftmost protruding corner of lesser subdivided area 916 to derive the row orientation (e.g., row orientation angle) within lesser subdivided area 916 by multiplying the interior corner angle of the lesser subdivided area 916 by a fractional multiple (e.g., ½). In still another example, the row orientation module 22 or the data processing system 10 may use the upper right corner of lesser subdivided area 918 to derive the row orientation (e.g., row orientation angle) within lesser subdivided area 918 by multiplying the interior corner angle of the lesser subdivided area 918 by a fractional multiple (e.g., ½).

Figure 7H:
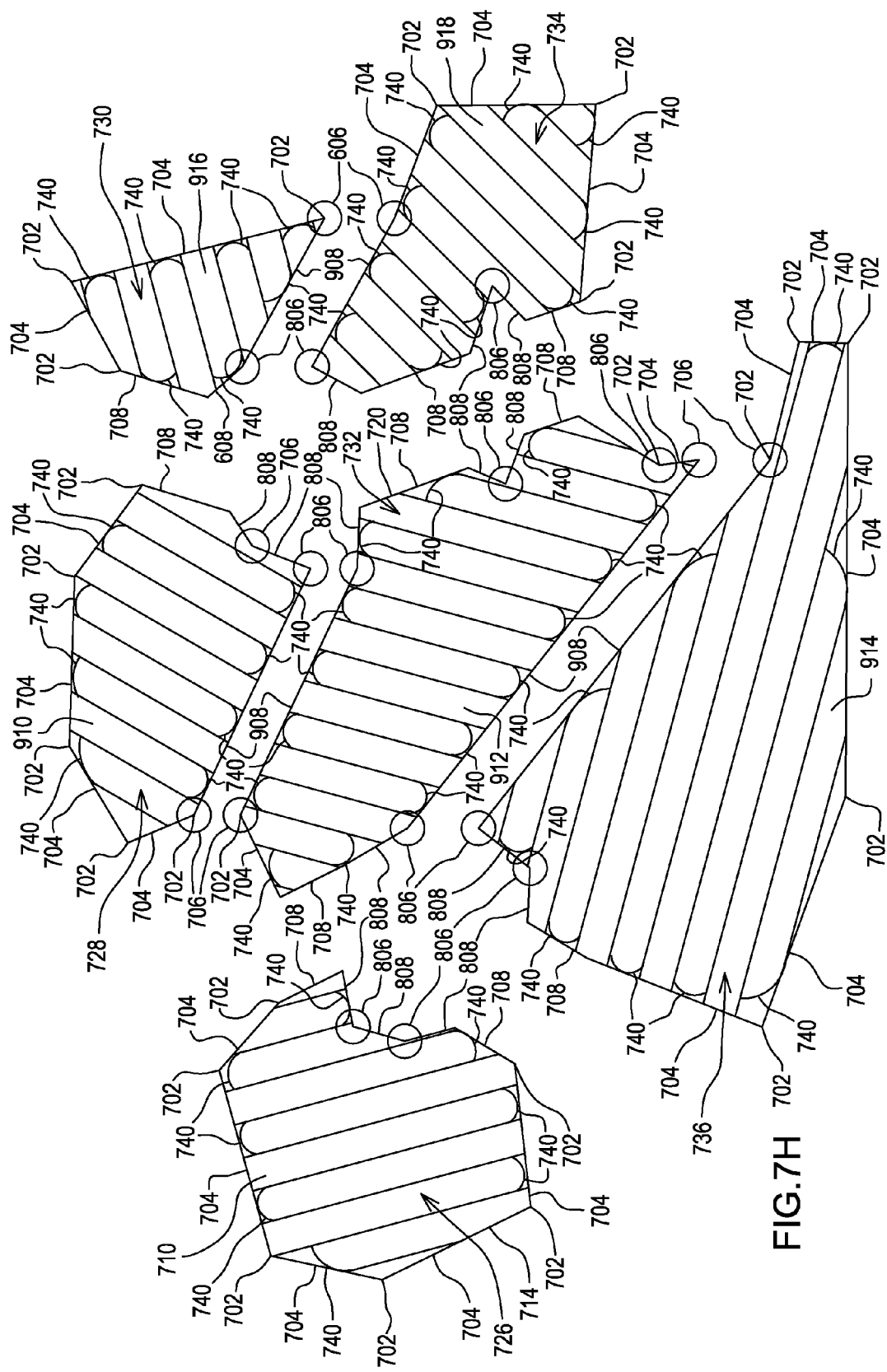
FIG. 7H is a plan view of an illustrative example of interconnecting the planned paths associated with different subdivided areas in the third illustrative region.

In FIG. 7H consistent with step S108, the path planning module 24 or data processing system 10 interconnects the planned path segments or rows associated within each subdivided area (710) and within each lesser subdivided area (910, 912, 914, 916 and 918) to each other by planned interconnection paths 740 between terminations of rows or straight sections of rows (e.g., at an end or a start of the rows).

Within each subdivided area or lesser subdivided area, the interconnection paths 620 or turns may be simple arcs, keyhole turns, row-skipping turns, or other turns that a vehicle is capable of making given the applicable row spacing between adjacent rows or alternate rows. Between different subdivided areas or between any subdivided area and a lesser subdivided area, or between lesser subdivided areas, the path planning module 24 interconnects at least one row from each subdivided area (or lesser subdivided area) to another row or path associated with another subdivided area (or lesser subdivided area) at row terminations or at nodes associated with different subdivided areas (or lesser subdivided areas).

In one embodiment, the path planning module 24 or the data processing module 10 searches for the combination of path interconnections 620 within and between subdivided areas (or lesser subdivided areas) to accomplish one or more of the following: such that a planned interconnection paths between different subdivided areas have a shortest distance between the different subdivided areas, such that the aggregate path to cover the region is minimized or has the shortest aggregate path length, such that the aggregate length of straight row sections, or generally linear path sections for the vehicle is maximized, or such that the aggregate length of turns or interconnection 620 is minimized.

The illustrative examples of the method and system disclosed herein are well suited for determining efficient path plans for vehicles in regions (e.g., complexly shaped regions or fields) that can be defined, modeled, or approximated as generally polygonal. The resultant path plan may feature a group of subdivided areas within the region based on identification of concave surfaces associated with an outer boundary of the region. Advantageously, the operator of the vehicle, who uses the efficient path plans of the system and method set forth herein, is not burdened with arduously manually determining a path plan or possible increased fuel consumption, increased vehicle distance traveled, excessive vehicle turns made, or increased vehicle active time that would otherwise be associated with a less efficient resultant path plan.

Having described the preferred embodiment, it will become apparent that various modifications can be made without departing from the scope of the invention as defined in the accompanying claims.

The following is claimed:

1. A method for determining a planned path for a vehicle, the method comprising:
   defining an outer boundary of a region as a series of interconnected linear segments that are joined at one or more nodes;
   identifying each concave surface associated with a corresponding concave node, among the nodes, by determining if an interior angle formed by the interconnected linear segments are greater than a threshold angle;
   establishing at least one subdivision line to divide the region into subdivided areas, where the subdivision line interconnects at or near two nonadjacent ones of the concave nodes associated with identified concave surfaces;
   determining a direction of orientation of rows for a planned path of the vehicle within each subdivided area as a predefined multiple of an interior angle associated with at least one of the concave nodes that are not interconnected by the subdivision line; and
   interconnecting the rows within different subdivided areas and between subdivided areas to each other by planned interconnection paths between terminations within each subdivided area to yield the planned path for the vehicle, wherein the defining, identifying, establishing, determining and interconnecting is performed by a data processing system.

2. The method according to claim 1 wherein the threshold angle is approximately one-hundred and eighty degrees.

3. The method according to claim 1 wherein each of the terminations comprises an end or a start of the rows within each subdivided area.

4. The method according to claim 1 wherein the terminations comprise nodes associated with different subdivided areas.

5. The method according to claim 1 wherein the defining is accomplished by:
traversing the outer boundary of the region with a vehicle equipped with a location-determining receiver that periodically or regularly estimates a location of the vehicle and that stores the estimated location as a series of points that lie on the traversed outer boundary; and
modeling the traversed outer boundary of the region by the series of interconnected linear segments that represent a best fit or approximate fit lying within or on the outer boundary.

6. The method according to claim 5 wherein the modeling comprises moving inward one or more nodes of the interconnected linear segments that would otherwise fall outside the outer boundary to fall within or on the outer boundary.

7. The method according to claim 1 wherein the establishing of the at least one subdivision line interconnects concave nodes associated with opposite sides of the outer boundary, where the outer boundary defines a polygon.

8. The method according to claim 1 wherein the establishing of the at least one subdivision line interconnects alternate concave nodes of the outer boundary, where the outer boundary defines a polygon.

9. The method according to claim 1 wherein the determining of the direction of orientation uses approximately one-third to approximately two-thirds as the predefined multiple of the interior angle.

10. The method according to claim 1 wherein the determining of the direction of orientation uses a fractional integer multiple as the predefined multiple of the interior angle.

11. The method according to claim 1 further comprising:
detecting an obstacle within the region near or intersecting with the subdivision line;
interconnecting the subdivision line with one or more linear segments associated with an inner boundary of the obstacle;
establishing at least one additional subdivision line to divide at least one of the subdivided areas into lesser subdivided areas, where the additional subdivision line interconnects at or near two nonadjacent ones of the concave nodes associated with concave surfaces of the subdivided areas;
determining a direction of orientation of rows for a planned path of the vehicle within each lesser subdivided area as a predefined multiple of an interior angle associated with at least one of the concave nodes that are not interconnected by the additional subdivision line; and
interconnecting the rows within different lesser subdivided areas and between lesser subdivided areas to each other by planned interconnection paths between terminations within each lesser subdivided area to yield the planned path for the vehicle.

12. A system for determining a planned path for a vehicle, the system comprising:
a data storage device;
a data processor for communication with the data storage device;
a boundary definer for defining an outer boundary of a region as a series of interconnected linear segments that are joined at one or more nodes;
a concave surface identifier for identifying each concave surface associated with a corresponding concave node, among the nodes, by determining if an interior angle formed by the interconnected linear segments are greater than a threshold angle;
a subdivision module for establishing at least one subdivision line to divide the region into subdivided areas, where the subdivision line interconnects at or near two nonadjacent ones of the concave nodes associated with identified concave surfaces;
a row orientation module for determining a direction of orientation of rows for a planned path of the vehicle within each subdivided area as a predefined multiple of an interior angle associated with at least one of the concave nodes that are not interconnected by the subdivision line; and
a path planning module for interconnecting the rows within different subdivided areas and between subdivided areas to each other by planned interconnection paths between terminations within each subdivided area to yield the planned path for the vehicle, wherein the boundary definer, the concave surface identifier, the subdivision module, the row orientation module, and the path planning module are storable in the data storage device for execution by the data processor.

13. The system according to claim 12 wherein the threshold angle is approximately one-hundred and eighty degrees.

14. The system according to claim 12 wherein each of the terminations comprises an end or a start of the rows within each subdivided area.

15. The system according to claim 12 wherein the terminations comprise nodes associated with different subdivided areas.

16. The system according to claim 12 further comprising:
a location-determining receiver on the vehicle that periodically or regularly estimates a location of the vehicle, wherein the boundary definer is adapted to store in a data storage device the estimated location as a series of points that lie on the traversed outer boundary; and
the boundary definer capable of modeling the traversed outer boundary of the region by the series of interconnected linear segments that represents a best fit or approximate fit lying within or on the outer boundary.

17. The system according to claim 16 wherein the boundary definer comprises program instructions to move inward one or more concave nodes of the interconnected linear segments that would otherwise fall outside the outer boundary to fall within or on the outer boundary.

18. The system according to claim 12 wherein the subdivision module comprises program instructions for establishing of the at least one subdivision line interconnects concave nodes associated with opposite sides of the outer boundary, where the outer boundary defines a polygon.

19. The system according to claim 12 wherein the subdivision module comprises program instructions for establishing of the at least one subdivision line interconnects alternate concave nodes of the outer boundary, where the outer boundary defines a polygon.

20. The system according to claim 12 wherein the row orientation module comprises program instructions for determining of the direction of orientation uses a fractional multiplier as the predefined multiple of the interior angle.

21. The system according to claim 12 wherein the row orientation module comprises program instructions for determining of the direction of orientation uses approximately one-half as the predefined multiple of the interior angle.

22. The system according to claim 12 further comprising:
a communications interface of the data processing system;
an obstacle detector for detecting an obstacle in the subdivision line, the obstacle detector capable of communication with the data processing system via a vehicle data bus and the communications interface, wherein the path planning module is arranged or instructed to search for the shortest distance of multiple linear segments between the detected obstacle and the nonadjacent ones of concave nodes;
the path planning module capable of interconnecting at least a segment of the subdivision line with the multiple linear segments of the detected obstacle to extend between the nonadjacent ones of the concave nodes.

* * * * *